(12) United States Patent
Kunze et al.

(10) Patent No.: US 9,416,053 B2
(45) Date of Patent: Aug. 16, 2016

(54) MOUNTING MAT INCLUDING INORGANIC NANOPARTICLES AND METHOD FOR MAKING THE SAME

(75) Inventors: Ulrich E. Kunze, Juerchen (DE); Lahoussaine Lalouch, Picardie (FR); Claus Middendorf, Neuss (DE); Harald H. Krieg, Meerbusch (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 1360 days.

(21) Appl. No.: 12/682,196

(22) PCT Filed: Oct. 7, 2008

(86) PCT No.: PCT/US2008/079027
§ 371 (c)(1),
(2), (4) Date: Apr. 8, 2010

(87) PCT Pub. No.: WO2009/048857
PCT Pub. Date: Apr. 16, 2009

(65) Prior Publication Data
US 2010/0209308 A1    Aug. 19, 2010

(30) Foreign Application Priority Data
Oct. 9, 2007    (EP) ..................................... 07118144

(51) Int. Cl.
*B01D 50/00*    (2006.01)
*C04B 30/02*    (2006.01)
(Continued)

(52) U.S. Cl.
CPC .............. *C04B 30/02* (2013.01); *D04H 1/4209* (2013.01); *D04H 1/4218* (2013.01); *D04H 1/46* (2013.01); *D04H 1/52* (2013.01); *D04H 1/541* (2013.01); *D04H 1/587* (2013.01); *D04H 1/645* (2013.01); *D04H 1/72* (2013.01); *D04H 1/732* (2013.01); *F01N 3/2853* (2013.01);
(Continued)

(58) Field of Classification Search
USPC ................................................... 422/179, 180
See application file for complete search history.

(56) References Cited

U.S. PATENT DOCUMENTS 3,001,571 A    9/1961    Hatch
3,493,424 A    2/1970    Mohrlok
(Continued)

FOREIGN PATENT DOCUMENTS

CN    1785626    6/2006
DE    19858025    6/2000
(Continued)

OTHER PUBLICATIONS

Howitt, "Flow Effects in Monolithic Honeycomb Automotive Catalytic Converters", SAE Technical Paper Series, No. 740244 (1974).
(Continued)

*Primary Examiner* — Tom P Duong

(57) ABSTRACT

The present invention relates to a mounting mat for mounting a pollution control device in a catalytic converter, the mounting mat comprising a non-woven mat of inorganic fibers having distributed therein inorganic particles having an average diameter of 1 nm to 100 nm and wherein the mounting mat is free of organic binder or contains organic binder in an amount of not more than 5% by weight, based on the total weight of the mounting mat. The invention further relates to a pollution control device including the mounting mat and to a method of making the mounting mat.

20 Claims, 4 Drawing Sheets

(51) Int. Cl.

| | | |
|---|---|---|
| *D04H 1/4209* | (2012.01) | |
| *D04H 1/4218* | (2012.01) | |
| *D04H 1/46* | (2012.01) | |
| *D04H 1/52* | (2006.01) | |
| *D04H 1/541* | (2012.01) | |
| *D04H 1/587* | (2012.01) | |
| *D04H 1/645* | (2012.01) | |
| *D04H 1/72* | (2012.01) | |
| *D04H 1/732* | (2012.01) | |
| *F01N 3/28* | (2006.01) | |

(52) U.S. Cl.
CPC ......... *F01N 2310/02* (2013.01); *Y10T 442/10* (2015.04); *Y10T 442/20* (2015.04)

(56) References Cited

U.S. PATENT DOCUMENTS

| | | | |
|---|---|---|---|
| 3,709,706 A | | 1/1973 | Sowman |
| 3,760,049 A | | 9/1973 | Borer |
| 3,916,057 A | | 10/1975 | Hatch |
| 4,181,514 A | | 1/1980 | Lefkowitz |
| 4,305,992 A | | 12/1981 | Langer |
| 4,351,736 A | | 9/1982 | Steinberger |
| 4,385,135 A | | 5/1983 | Langer |
| 4,746,570 A | | 5/1988 | Suzaki |
| 4,781,844 A | | 11/1988 | Kortmann |
| 5,073,442 A | | 12/1991 | Knowlton |
| 5,207,989 A | | 5/1993 | MacNeil |
| 5,242,871 A | | 9/1993 | Hashimoto |
| 5,250,269 A | | 10/1993 | Langer |
| 5,254,410 A | | 10/1993 | Langer |
| 5,290,522 A | | 3/1994 | Rogers |
| 5,332,609 A | * | 7/1994 | Corn ............................... 428/77 |
| 5,332,699 A | | 7/1994 | Olds |
| 5,380,580 A | * | 1/1995 | Rogers et al. ................. 428/219 |
| 5,385,873 A | | 1/1995 | MacNeill |
| 5,580,532 A | | 12/1996 | Robinson |
| 5,585,312 A | | 12/1996 | TenEyck |
| 5,714,421 A | | 2/1998 | Olds |
| 5,874,375 A | | 2/1999 | Zoitos |
| 6,051,193 A | | 4/2000 | Langer |
| 6,224,835 B1 | | 5/2001 | Langer |
| 6,458,418 B2 | | 10/2002 | Langer |
| 6,733,628 B2 | | 5/2004 | Dinwoodie |
| 7,033,412 B2 | | 4/2006 | Kumar |
| 7,491,354 B2 | | 2/2009 | Andersen |
| 2004/0052698 A1 | * | 3/2004 | Sanocki et al. ................ 422/179 |
| 2005/0232827 A1 | * | 10/2005 | Merry .............................. 422/179 |
| 2006/0008395 A1 | | 1/2006 | Ten Eyck |
| 2007/0107394 A1 | * | 5/2007 | Jankowski ....................... 55/523 |
| 2009/0022633 A1 | * | 1/2009 | Tomosue et al. ............... 422/177 |
| 2010/0207298 A1 | | 8/2010 | Kunze |
| 2010/0209306 A1 | | 8/2010 | Kunze |

FOREIGN PATENT DOCUMENTS

| | | |
|---|---|---|
| EP | 1388649 | 2/2004 |
| EP | 1491248 | 12/2004 |
| EP | 1731729 | 12/2006 |
| EP | 1772600 | 4/2007 |
| GB | 1522646 | 8/1978 |
| GB | 2447959 | 10/2008 |
| JP | 56085012 | 7/1981 |
| JP | 58013683 | 1/1983 |
| JP | 07-286514 | 10/1995 |
| JP | 2002/047070 | 2/2002 |
| JP | 2002206421 | 7/2002 |
| JP | 2005194904 | 7/2005 |
| JP | 2006-062239 | 3/2006 |
| WO | WO 95/04182 | 2/1995 |
| WO | WO 97/32118 | 9/1997 |
| WO | WO 99/46028 | 9/1999 |
| WO | WO 00/75496 | 12/2000 |
| WO | WO 2004/031544 | 4/2004 |
| WO | WO 2004/054942 | 7/2004 |
| WO | WO 2005/003530 | 1/2005 |
| WO | WO 2005/021945 | 3/2005 |
| WO | WO 2005/044529 | 5/2005 |
| WO | WO 2006/020058 | 2/2006 |
| WO | WO 2007/030410 | 3/2007 |
| WO | WO 2007/047273 | 4/2007 |
| WO | WO 2007/143437 | 12/2007 |

OTHER PUBLICATIONS

Howitt, "Thin Wall Ceramics as Monolithic Catalyst Supports", SAE Technical Paper Series, No. 800082 (1980).
Stroom, "Systems Approach to Packaging Design for Automotive Catalytic Converters", SAE Technical Paper Series, No. 900500 (1990).
Umehara, "Advanced Ceramic Substrate: Catalytic Performance Improvement by High Geometric Surface Area and Low Heat Capacity", SAE Technical Paper Series, No. 971029 (1997), pp. 115-122.
Yau, "Modern Size-Exclusion Liquid Chromatography: Practice of Gel Permeation and Gel Filtration Chromatography", John Wiley & Sons, 1979 (461 pages).
European Search Report for PCT Application No. 07118137, 7 pgs.
International Search Report for PCT/US2008/079030, 5 pgs.
European Search Report for App. No. 07118141, 9 pgs.
International Search Report for PCT/US2008/079024, 3 pgs.
European Search Report for App. No. 07118144, 11 pgs.
International Search Report for PCT/US2008/079027, 4 pgs.

* cited by examiner

MOUNTING MAT INCLUDING INORGANIC NANOPARTICLES AND METHOD FOR MAKING THE SAME

CROSS REFERENCE TO RELATED APPLICATIONS

This application is a national stage filing under 35 U.S.C. §371 of PCT/US2008/079027, filed Oct. 7, 2008, which claims priority to European Application No. 071181440.0, filed Oct. 9, 2007, the disclosure of which is incorporated by reference in its/their entirety herein.

FIELD OF THE INVENTION

The present invention relates to a mounting mat suitable for mounting a pollution control element in a pollution control device. In particular the present invention relates to a mounting mat that includes a powder of inorganic nanoparticles. The invention further relates to a method of making such a mounting mat. Still further the present invention relates to a pollution control device including the mounting mat.

BACKGROUND

Pollution control devices are employed on motor vehicles to control atmospheric pollution. Such devices include a pollution control element. Exemplary pollution control devices include catalytic converters and diesel particulate filters or traps. Catalytic converters typically contain a ceramic monolithic structure having walls that support the catalyst. The catalyst typically oxidizes carbon monoxide and hydrocarbons, and reduces the oxides of nitrogen in engine exhaust gases to control atmospheric pollution. The monolithic structure may also be made of metal. Diesel particulate filters or traps typically include wall flow filters that are often honeycombed monolithic structures made, for example, from porous ceramic materials. The filters typically remove soot and other exhaust particulate from the engine exhaust gases. Each of these devices has a housing (typically made of a metal like stainless steel) that holds the pollution control element. Monolithic pollution control elements, are often described by their wall thickness and the number of openings or cells per square inch (cpsi). In the early 1970s, ceramic monolithic pollution control elements with a wall thickness of 12 mil (304 micrometer) and a cell density of 300 cpsi (47 cells per cm$^2$) were common ("300/12 monoliths").

As emission laws become more stringent, wall thicknesses have decreased as a way of increasing geometric surface area, decreasing heat capacity and decreasing pressure drop of the monolith. The standard has progressed to 900/2 monoliths. With their thin walls, ceramic monolithic structures are fragile and susceptible to vibration or shock damage and breakage. The damaging forces may come from rough handling or dropping during the assembly of the pollution control device, from engine vibration or from travel over rough roads. The ceramic monoliths are also subject to damage due to high thermal shock, such as from contact with road spray.

The ceramic monoliths have a coefficient of thermal expansion generally an order of magnitude less than the metal housing which contains them. For instance, the gap between the peripheral wall of the metal housing and the monolith may start at about 4 mm, and may increase a total of about 0.33 mm as the engine heats the catalytic converter monolithic element from 25° C. to a maximum operating temperature of about 900° C. At the same time, the metallic housing increases from a temperature of about 25° C. to about 530° C. Even though the metallic housing undergoes a smaller temperature change, the higher coefficient of thermal expansion of the metallic housing causes the housing to expand to a larger peripheral size faster than the expansion of the monolithic element. Such thermal cycling typically occurs hundreds or thousands of times during the life of the vehicle.

To avoid damage to the ceramic monoliths from road shock and vibrations, to compensate for the thermal expansion difference, and to prevent exhaust gases from passing between the monoliths and the metal housings (thereby bypassing the catalyst), mounting mats are disposed between the ceramic monoliths and the metal housings. The process of placing the monolith within the housing is also called canning and includes such steps as wrapping a sheet of mat material around the monolith, inserting the wrapped monolith into the housing, pressing the housing closed, and welding flanges along the lateral edges of the housing.

Typically, the mounting mat materials include inorganic fibers, optionally intumescent materials, organic binders, fillers and other adjuvants. Known mat materials, used for mounting a monolith in a housing are described in, for example, U.S. Pat. No. 3,916,057 (Hatch et al.), U.S. Pat. No. 4,305,992 (Langer et al.), U.S. Pat. No. 4,385,135 (Langer et al.), U.S. Pat. No. 5,254,410 (Langer et al.), U.S. Pat. No. 5,242,871 (Hashimoto et al.), U.S. Pat. No. 3,001,571 (Hatch), U.S. Pat. No. 5,385,873 (MacNeil), and U.S. Pat. No. 5,207,989 (MacNeil), GB 1,522,646 (Wood), published Aug. 23, 1978, Japanese Kokai No.: J.P. Sho. 58-13683, published Jan. 26, 1983 (i.e., Pat Appln Publn No. J.P. Hei. 2-43786 and Appln No. J.P. Sho. 56-1 12413), and Japanese Kokai No.: J.P. Sho. 56-85012, published Jul. 10, 1981 (i.e., Pat. Appln No. Sho. 54-168541). Mounting materials should remain very resilient at a full range of operating temperatures over a prolonged period of use.

A need exists for a mounting system which is sufficiently resilient and compressible to accommodate the changing gap between the monolith and the metal housing over a wide range of operating temperatures and a large number of thermal cycles. While the state of the art mounting materials have their own utilities and advantages, there remains an ongoing need to improve mounting materials for use in pollution control devices. Additionally, one of the primary concerns in forming the mounting mat is balancing between the cost of the materials and performance attributes. It is desirable to provide such a high quality mounting system at the lowest possible cost.

A particular need exists to provide a mounting mat or system that provides an improved holding pressure at ambient temperature as well as at the operating temperatures to which the pollution control device that includes the mounting mat may be exposed to. It is furthermore particularly desired to find a way to improve the holding pressure in intumescent as well as in non-intumescent mounting mats. Furthermore, it would be desired to find a solution that can be used even when the mounting mat is free of organic binder or low in organic binder content. To find such a solution is particularly desirable as the use of large amounts of organic binder in a mounting mat is undesirable as it may lower the performance of the mounting mat and/or is environmentally disadvantageous as the binder usually needs to be burnt out during first use of the pollution control device. Developing mounting mats that are low in binder content and that have an improved holding pressure has proven to be particularly challenging for intumescent mounting mats because these mats are prone to cracking during the mounting of the mat in the pollution control device.

US 2006/008395 (Ten Eyck et al.) discloses a surface treatment of inorganic fibers and in particular of leached glass fibers to achieve an increased holding performance of non-intumescent mats. However, the method of manufacturing disclosed to obtain the coated fibers is cumbersome and expensive as it involves the use of a slurry of colloidal material for treating the fibers. The treatment of the fibers further includes a heat treatment which means an increased energy cost in the manufacturing.

Accordingly, it would be a further desire to find a method of making mounting mats of improved performance and that can be manufactured in an easy and convenient way at a lower cost.

SUMMARY

In a first aspect, the invention provides a mounting mat for mounting a pollution control device in a catalytic converter, the mounting mat comprising a non-woven mat of inorganic fibers having distributed therein inorganic particles having an average diameter of 1 nanometer (nm) to 100 nm and wherein the mounting mat is free of organic binder or contains organic binder in an amount of not more than 5% by weight, based on the total weight of the mounting mat.

In a second aspect, the invention provides a pollution control device having a housing, a pollution control element disposed within the housing, and a mounting mat disposed between the pollution control element and the housing for positioning the pollution control element and for absorbing mechanical and thermal shock, wherein the mounting mat comprises a mounting mat as described above.

In a third aspect, the invention provides a method of making a mounting mat as defined above comprising the steps of:
(i) supplying inorganic fibers through an inlet of a forming box having an open bottom positioned over a forming wire to form a mat of fibers on the forming wire, the forming box having a plurality of fiber separating rollers provided in at least one row in the housing between the inlet and housing bottom for breaking apart clumps of fibers and an endless belt screen;
(ii) capturing clumps of fibers on a lower run of the endless belt beneath fiber separating rollers and above the forming wire;
(iii) conveying captured clumps of fibers on the endless belt above fiber separating rollers to enable captured clumps to release from the belt and to contact and be broken apart by the rollers;
(iv) transporting the mat of fibers out of the forming box by the forming wire; and
(v) compressing the mat of fibers and restraining the mat of fibers in its compressed state thereby obtaining a mounting mat having a desired thickness suitable for mounting a pollution control element in the housing of a catalytic converter;
and wherein inorganic particles having an average diameter of 1 nm to 100 nm are provided in the mounting mat.

The mounting mats in accordance with the present invention can be produced in a cost effective and easy way and generally have an improved performance, e.g. holding performance at ambient conditions as well as under operating conditions, when used to mount a pollution control element into a pollution control device. Furthermore, the use of the inorganic nanoparticles (particles having an average diameter of 1 nm to 100 nm) in a particular embodiment offers the possibility to obtain mounting mats that are low (not more than 5% by weight of organic binder, for example, not more than 3% by weight of organic binder or not more than 2% by weight of organic binder) in organic binder content or that are free of organic binder. In particular, intumescent mounting mats of improved performance and low in organic binder content or free of organic binder can be obtained.

The mounting mat includes inorganic nanoparticles. The inorganic nanoparticles have an average diameter between 1 nm and 100 nm, for example between 2 nm and 80 nm, for example between 3 nm and 60 nm or between 3 nm and 50 nm. In a particular embodiment, the average diameter is between 8 nm and 45 nm. The inorganic nanoparticles can have any shape although generally, the particles will be generally spherical in shape or will have a disc like shape. To the extent that the particles are not spherical, the term 'diameter' should be understood to mean the measure of the largest dimension of the particle. Also, in the connection with the present invention, the average diameter is typically the weight average diameter.

The inorganic nanoparticles may vary widely in their chemical composition although they typically comprise oxides such as oxides of silica, alumina, titanium and/or zirconia. Further inorganic nanoparticles include silicates containing Mg, Ca, Al, Zr, Fe, Na, K and/or Li such as micas, clays and zeolites. Commercially available nanoparticles that can be used include those available under the trade designation "NALCO", from Nalco Chemical Inc, Leiden, Netherlands, "AEROSIL", from Evonik Industries, Frankfurt, Germany, "LAPONITE" from Rockwood Additives Ltd, Widnes, UK, "MICROLITE", from Elkem ASA, Voogsbygd, Norway, "BENTONITE" from Bentonite Performance Minerals LLC, Houston, Tex., USA, and "BINDZIL" from Eka Chemicals AB, Gothenburg, Sweden.

The inorganic nanoparticles are typically included in the mounting mat in an amount of at least 0.5% by weight based on total weight of the mat. An exemplary range is from 0.5 to 10%, for example, from 0.6% by weight to 8% by weight or from 0.8% by weight to 7% by weight.

Figure 1:
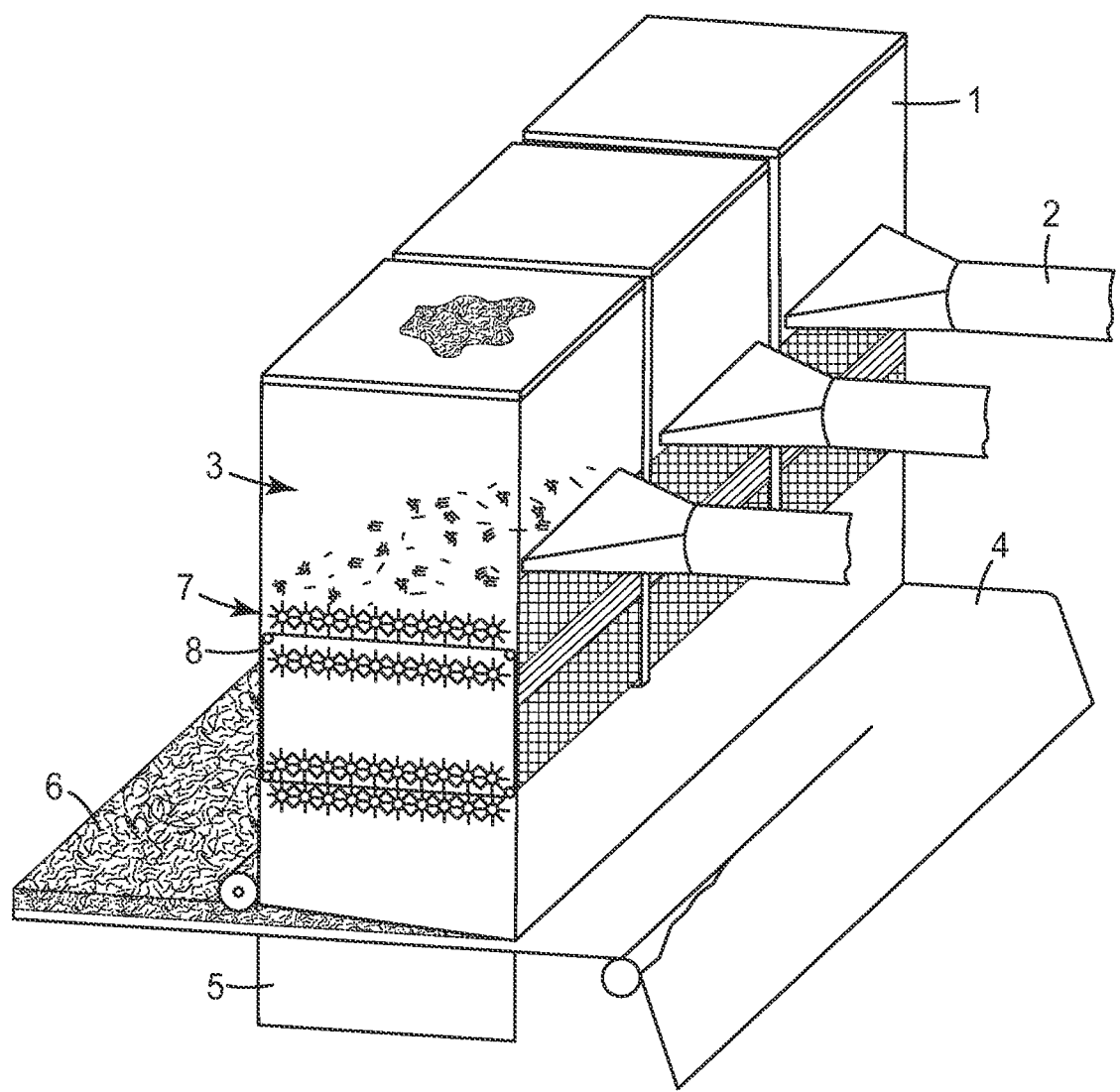
FIG. 1 shows a schematic perspective view of a forming box.
Figure 2:
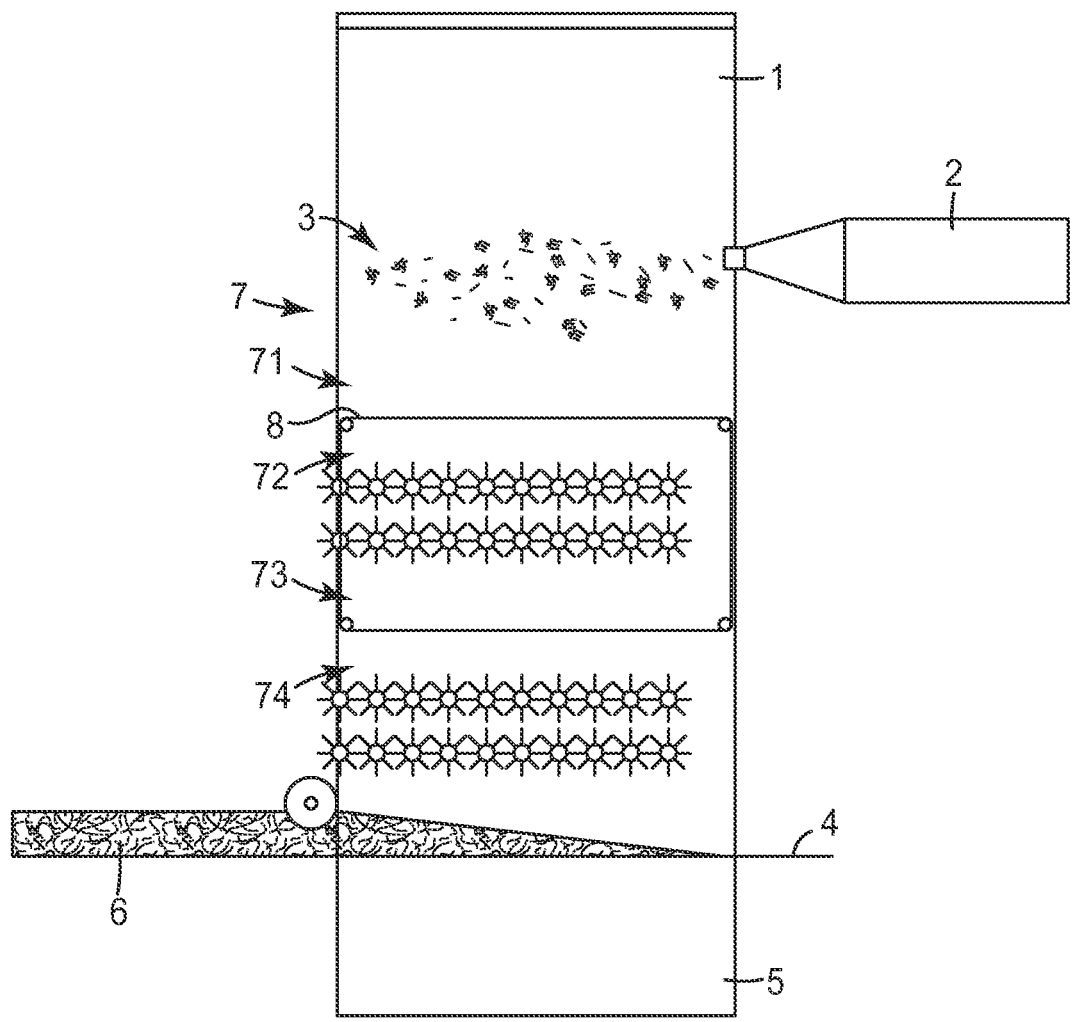
FIG. 2 shows a schematic side view of a forming box.
Figure 3:
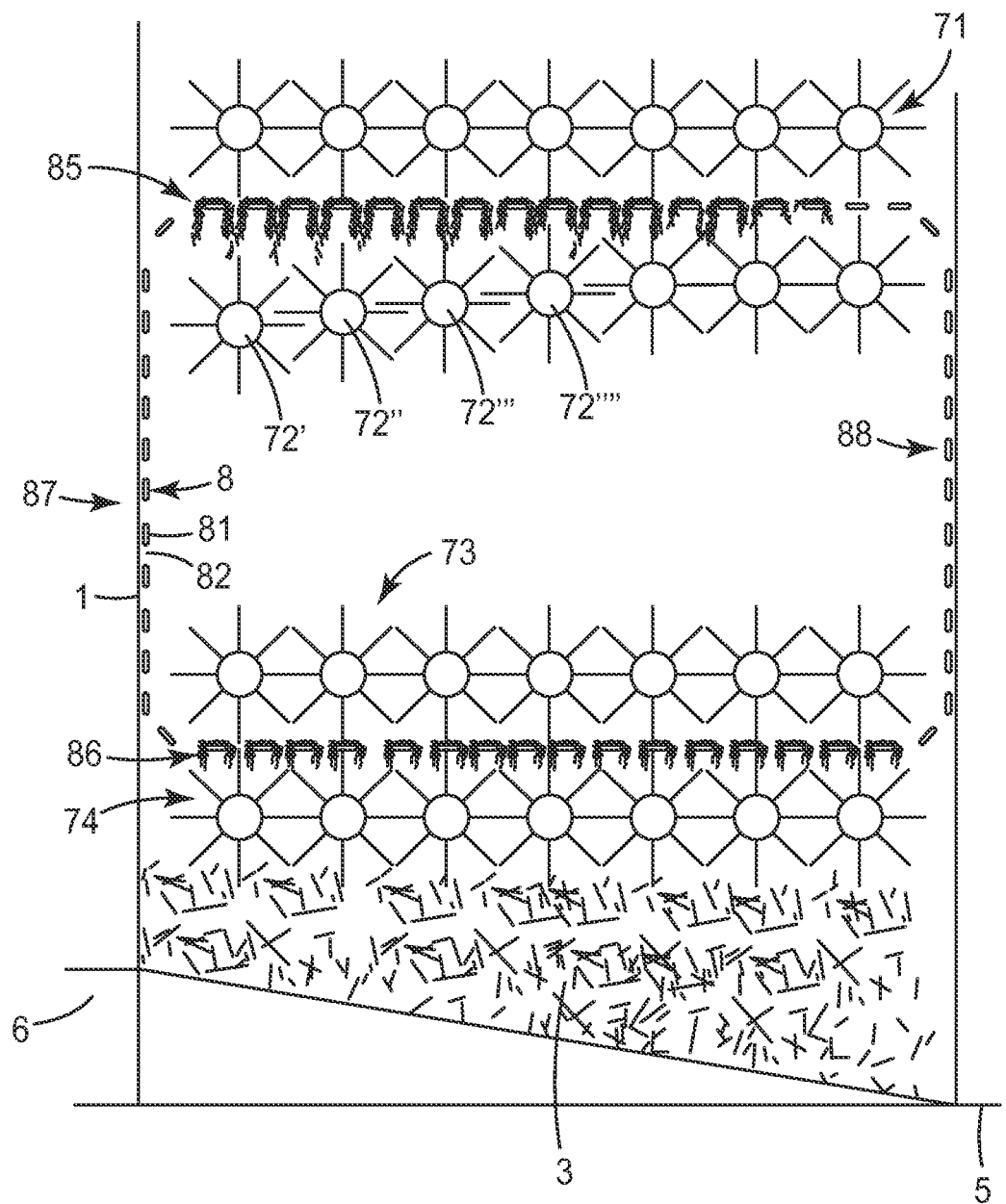
FIG. 3 shows a detailed view of the forming box shown in FIG. 2.

The inorganic nanoparticles may be provided in the mounting mat in a variety of ways. For example, in one embodiment, the inorganic nanoparticles may be sprayed on the fibers from a solution or dispersion (e.g., an aqueous dispersion) before the fibers are being laid into a non-woven web and formed into a mounting mat. According to another embodiment, a dispersion of nanoparticles may be used to impregnate a formed non-woven web or mounting mat or the dispersion may be sprayed thereon. In yet a further embodiment the nanoparticles may be added as a dry powder together with the fibers in a dry air laying process, in particular the dry air layer process described further below, for example using a forming machine as illustrated in FIGS. 1-3.

Fibers used in the mounting mat are generally those fibers that are capable of withstanding the temperatures of the exhaust gas to which they may be exposed. Typically, the fibers used are inorganic fibers include refractory ceramic fibers, glass fibers, and polycrystalline inorganic fibers. Examples of inorganic fibers materials include alumina, silica, alumina-silica such as mullite, glass, ceramic, carbon, silicon carbide, boron, aluminoborosilicate, zirconia, titania, etc. These inorganic materials may be used singly, or at least two of them may be mixed and used in combination. For example, the inorganic fiber material may comprise alumina alone, or another inorganic material may further be used in combination with alumina, such as silica. Alumina-silica fiber materials may contain further metal oxides such as sodium, potassium, calcium, magnesium, and boron oxides. The inorganic fibers may be used either individually or in combination of two or more kinds. Among these inorganic fibers, ceramic fibers such as alumina fibers, silica fibers and alumina-silica fibers may be used in one particular embodiment, alumina fibers and alumina-silica fibers may be used in another embodiment, and polycrystalline alumina-silica fibers may be used in yet a further embodiment.

In a particular embodiment, the inorganic fibers of the mat comprise ceramic fibers that are obtained from a sol-gel process. By the term "sol-gel" process is meant that the fibers are formed by spinning or extruding a solution or dispersion or a generally viscous concentrate of the constituting components of the fibers or precursors thereof. The sol-gel process is thus to be contrasted with a process of melt forming fibers whereby the fibers are formed by extruding a melt of the components of the fibers. A suitable sol-gel process is for example disclosed in U.S. Pat. No. 3,760,049 (Borer et al.), wherein there is taught to form the ceramic fibers by extruding a solution or dispersion of metal compounds through orifices thereby forming continuous green fibers which are then fired to obtain the ceramic fibers. The metal compounds are typically metal compounds that are calcinable to metal oxides. Often the sol-gel formed fibers are crystalline or semicrystalline, which are known in the art as polycrystalline fibers.

Examples of solutions or dispersions of metal compounds to form fibers according to a sol-gel process include aqueous solutions of an oxygen-containing zirconium compound, such as zirconium diacetate, containing colloidal silica, such as disclosed in U.S. Pat. No. 3,709,706 (Sowman). A further example includes an aqueous solution of water-soluble or dispersible aluminum and boron compounds, such as aqueous basic aluminum acetate, or a two-phase system comprising an aqueous mixture of a colloidal dispersion of silica and water-soluble or dispersible aluminum and boron compounds. Other representative refractory metal oxide fibers which can be made in a sol-gel process include zirconia, zircon, zirconia-calcia, alumina, magnesium aluminate, aluminum silicate, and the like. Such fibers additionally can contain various metal oxides, such as iron oxide, chromia, and cobalt oxide.

Ceramic fibers which are useful in the mounting mat include polycrystalline oxide ceramic fibers such as mullites, alumina, high alumina aluminosilicates, aluminosilicates, zirconia, titania, chromium oxide and the like. Preferred fibers, which are typically high alumina, crystalline fibers, comprise aluminum oxide in the range from about 60 to about 98 percent by weight and silicon oxide in the range from about 40 to about 2 percent by weight. These fibers are commercially available, for example, under the trade designations "NEXTEL 550" from the 3M Company, St. Paul, Minn., "SAFFIL" available from Dyson Group PLC, Sheffield, UK, "MAFTEC" available from Mitsubishi Chemical Corp., Tokyo, Japan, "FIBERMAX" from Unifrax, Niagara Falls, N.Y., and "ALTRA" from Rath GmbH, Germany.

Suitable polycrystalline oxide ceramic fibers further include aluminoborosilicate fibers preferably comprising aluminum oxide in the range from about 55 to about 75 percent by weight, silicon oxide in the range from less than about 45 to greater than zero (preferably, less than 44 to greater than zero) percent by weight, and boron oxide in the range from less than 25 to greater than zero (preferably, about 1 to about 5) percent by weight (calculated on a theoretical oxide basis as $Al_2O_3$, $SiO_2$, and $B_2O_3$, respectively).

The aluminoborosilicate fibers preferably are at least 50 percent by weight crystalline, more preferably, at least 75 percent, and most preferably, about 100% (i.e., crystalline fibers). Aluminoborosilicate fibers are commercially available, for example, under the trade designations "NEXTEL 312" and "NEXTEL 440" from the 3M Company. The ceramic fibers obtainable through a sol-gel process are typically shot free or contain a very low amount of shot, typically less than 1% by weight based on total weight of the ceramic fibers. Also, the ceramic fibers will typically have an average diameter between 1 micrometer and 16 micrometers. In a preferred embodiment, the ceramic fibers have an average diameter of 5 micrometers or more and preferably the ceramic fibers are free or essentially free of fibers having a diameter of less than 3 micrometers, more preferably the ceramic fiber layer will be free or essentially free of fibers that have a diameter of less than 4 micrometers. Essentially free here means that the amount of such small diameter fibers is not more than 1% by weight, preferably not more than 0.1% by weight of the total weight of fibers in the ceramic fiber layer.

In a further embodiment, the inorganic fibers used may comprise heat treated ceramic fibers sometimes called annealed ceramic fibers Annealed ceramic fibers may be obtained as disclosed in U.S. Pat. No. 5,250,269 (Langer) or WO 99/46028, published Sep. 16, 1999. According to the teaching of these documents, annealed ceramic fibers may be obtained by annealing melt-formed refractory ceramic fibers at a temperature of at least 700° C. By annealing the ceramic fibers, fibers are obtained that have an increased resilience. Typically, a resilience value of at least 10 kPa may be obtained under the test conditions set out in U.S. Pat. No. 5,250,269 (Langer). The melt-formed refractory ceramic fibers suitable for annealing, can be melt-blown or melt-spun from a variety of metal oxides, preferably a mixture of $Al_2O_3$ and $SiO_2$ having from 30 to 70% by weight of alumina and from 70 to 30% by weight of silica, preferably about equal parts by weight. The mixture can include other oxides such as $B_2O_3$, $P_2O_5$, and $ZrO_2$. Suitable melt-formed refractory ceramic fibers are available from a number of commercial sources and include these known under the trade designation "FIBERFRAX" from Carborundum Co., Niagara Falls, N.Y., "CERAFIBER" and "KAOWOOL" from Thermal Ceramics Co., Augusta, Ga.; "CER-WOOL" from Premier Refractories Co., Erwin, Tenn.; and "SNSC" from Shin-Nippon Steel Chemical, Tokyo, Japan. The manufacturer of ceramic fibers known under the trade designation "CER-WOOL" states that they are melt-spun from a mixture of by weight 48% silica and 52% alumina and have an average fiber diameter of 3-4 micrometers. The manufacturer of ceramic fibers known under the trade designation "CERAFIBER" states that they are meltspun from a mixture of by weight 54% silica and 46% alumina and have an average fiber diameter of 2.5-3.5 micrometers. The manufacturer of ceramic fibers "SNSC 1260-D 1" states that they are melt-formed from a mixture of by weight 54% silica and 46% alumina and have an average fiber diameter of about 2 micrometers.

In a particular embodiment, the fibers used include glass fibers and in particular magnesium aluminium silicate glass fibers. Examples of magnesium aluminium silicate glass fibers that can be used include glass fibers having between 10 and 30% by weight of aluminium oxide, between 52 and 70% by weight of silicon oxide and between 1 and 12% of magnesium oxide. The weight percentage of the aforementioned oxides are based on the theoretical amount of $Al_2O_3$, $SiO_2$ and MgO. It will further be understood that the magnesium aluminium silicate glass fiber may contain additional oxides. For example, additional oxides that may be present include sodium or potassium oxides, boron oxide and calcium oxide. Particular examples of magnesium aluminium silicate glass fibers include E-glass fibers which typically have a composition of about 55% of $SiO_2$, 15% of $Al_2O_3$, 7% of $B_2O_3$, 19% of CaO, 3% of MgO and 1% of other oxides; S and S-2 glass fibers which typically have a composition of about 65% of $SiO_2$, 25% of $Al_2O_3$ and 10% of MgO and R-glass fibers which typically have a composition of 60% of $SiO_2$, 25% of $Al_2O_3$, 9% of CaO and 6% of MgO. E-glass, S-glass and S-2 glass are available, for example, from Advanced Glassfiber Yarns LLC and R-glass is available from Saint-Gobain Vetrotex. The glass fibers are typically chopped magnesium aluminium silicate glass fibers and typically free of or essentially free of shot, i.e. having not more than 5% by weight of shot.

In a particular embodiment, heat treated glass fibers may be used. It has been found that heat treating glass fibers may improve the heat resistance of the glass fibers. Glass fibers may be heat treated at a temperature of up to about 50° C. or 100° C. below the softening or melting point of the glass. Generally, the minimum temperature for heat treatment of the glass will be about 400° C. although lower temperatures of for example at least 300° C. are conceivable as well. Nevertheless, a lower temperature will typically require a longer exposure to heat in order to achieve the desired increase in heat resistance of the glass fibers. With a temperature of between 300° C. and about 50° C. below the softening or melting point of the glass, the heat treatment will typically take about 2 minutes to about 1 hour, for example, 5 minutes to 30 minutes.

In a particular embodiment in connection with the present invention, the inorganic fibers of the mounting mat may comprise biosoluble fibers. As used herein, "biosoluble fibers" refers to fibers that are decomposable in a physiological medium or a simulated physiological medium. Physiological medium includes, but is not limited to, those bodily fluids typically found in the respiratory tract such as, for example, the lungs of animals or humans. As used herein, "durable" refers to fibers that are not biosoluble.

Biosolubility can be estimated by observing the effects of direct implantation of the fibers in test animals or by examination of animals or humans that have been exposed to fibers. Biosolubility can also be estimated by measuring the solubility of the fibers as a function of time in simulated physiological medium such as saline solutions, buffered saline solutions, or the like. One such method of determining solubility is described in U.S. Pat. No. 5,874,375 (Zoitas et al.). Typically, biosoluble fibers are soluble or substantially soluble in a physiological medium within about 1 year. As used herein, the term "substantially soluble" refers to fibers that are at least about 75 weight percent dissolved. In some embodiments, at least about 50 percent of the fibers are soluble in a physiological medium within about six months. In other embodiments, at least about 50 percent of the fibers are soluble in a physiological fluid within about three months. In still other embodiments, at least about 50 percent of the biosoluble fibers are soluble in a physiological fluid within at least about 40 days. For example, the fibers can be certified by the Fraunhofer Institut as passing the tests for the biopersistence of high temperature insulation fibers in rats after intratracheal instillation (i.e., the fibers have a halftime less than 40 days).

Yet another approach to estimating the biosolubility of fibers is based on the composition of the fibers. For example, Germany proposed a classification based on a carcinogenicity index (KI value). The KI value is calculated by a summation of the weight percentages of alkaline and alkaline-earth oxides and subtraction of two times the weight percent of aluminum oxide in inorganic oxide fibers. Inorganic fibers that are biosoluble typically have a KI value of about 40 or greater.

Biosoluble inorganic fibers suitable for use in the present invention typically include, but are not limited to, inorganic oxides such as, for example, $Na_2O$, $K_2O$, CaO, MgO, $P_2O_5$, $Li_2O$, BaO, or combinations thereof with silica. Other metal oxides or other ceramic constituents can be included in the biosoluble inorganic fibers even though these constituents, by themselves, lack the desired solubility but are present in low enough quantities such that the fibers, as a whole, are still decomposable in a physiological medium. Such metal oxides include, for example, $Al_2O_3$, $TiO_2$, $ZrO_2$, $B_2O_3$, and iron oxides. The biosoluble inorganic fibers can also include metallic components in amounts such that the fibers are decomposable in a physiological medium or simulated physiological medium.

In one embodiment, the biosoluble inorganic fibers include oxides of silica, magnesium, and calcium. These types of fibers are typically referred to as calcium magnesium silicate fibers. The calcium magnesium silicate fibers usually contain less than about 10 weight percent aluminum oxide. In some embodiments, the fibers include from about 45 to about 90 weight percent $SiO_2$, up to about 45 weight percent CaO, up to about 35 weight percent MgO, and less than about 10 weight percent $Al_2O_3$. For example, the fibers can contain about 55 to about 75 weight percent $SO_2$, about 25 to about 45 weight 30 percent CaO, about 1 to about 10 weight percent MgO, and less than about 5 weight percent $Al_2O_3$.

In a further embodiment, the biosoluble inorganic fibers include oxides of silica and magnesia. These types of fibers are typically referred to as magnesium silicate fibers. The magnesium silicate fibers usually contain from about 60 to about 90 weight percent $SiO_2$, up to about 35 weight percent MgO (typically, from about 15 to about 30 weight 5 percent MgO), and less than about 5 weight percent $Al_2O_3$. For example, the fibers can contain about 70 to about 80 weight percent $SO_2$, about 18 to about 27 weight percent MgO, and less than about 4 weight percent of other trace elements. Suitable biosoluble inorganic oxides fibers are described in U.S. Pat. No. 5,332,699 (Olds et al.); U.S. Pat. No. 5,585,312 (Ten Eyck et al.); U.S. Pat. No. 5,714,421 (Olds et al.); and U.S. Pat. No. 5,874,375 (Zoitas et al.); and European Patent Application 02078103.5, filed on Jul. 31, 2002. Various methods can be used to form biosoluble inorganic fibers including, but not limited to, sol gel formation, crystal growing processes, and melt forming techniques such as spinning or blowing.

Biosoluble fibers are commercially available from Unifrax Corporation, Niagara Falls, N.Y. under the trade designations "ISOFRAX" and "INSULFRAX." Other biosoluble fibers are sold by Thermal Ceramics, Augusta, Ga., under the trade designation "SUPERWOOL." For example, "SUPERWOOL 607" fiber contains 60 to 70 weight percent $SiO_2$, 25 to 35 weight percent CaO, 4 to 7 weight percent MgO, and a trace amount of $Al_2O_3$. "SUPERWOOL 607 MAX" fiber can be used at a slightly higher temperature and contains 60 to 70 weight percent $SiO_2$, 16 to 22 weight percent CaO, 12 to 19 weight percent MgO, and a trace amount of $Al_2O_3$.

In a particular embodiment in connection with the present invention, the above mentioned biosoluble fibers are used in combination with inorganic fibers, including heat treated glass fibers. When used in combination with one or more other inorganic fibers (i.e., non biosoluble fibers), the biosoluble fibers may be used in an amount between 97% and 10% based on the total weight of inorganic fibers. In a particular embodiment the amount of biosoluble fibers is between 95% and 30% or between 85% and 25%, based on the total weight of inorganic fibers.

The inorganic fibers for use with the present method typically have an average diameter of from about 1 micrometers to 50 micrometers, more preferably about from 2 micrometers to 14 micrometers, and most preferably from 4 micrometers to 8 micrometers. When the inorganic fibers have an average diameter less than about 4 micrometers, the portion of respirable and potentially hazardous fibers may become significant. In a particular embodiment, fibers having a different average diameter may be combined to make a mounting mat. The present method allows for easy and cost effective production of mounting mats composed of fibers having different average diameters.

Furthermore, there is no specific limitation on the length of the inorganic fibers, similarly to the average diameter. However, the inorganic fibers typically have an average length of from about 0.01 mm to 1000 mm, and most preferably about 0.5 mm to 300 mm. In a particular embodiment, fibers having a different average length may be combined in making a mounting mat. For example, a mounting mat having a mixture of short and long fibers may be readily produced. In a particular embodiment, the mounting mat produced may include short fibers that have a length of not more than 15 mm and long fibers that have a length of at least 20 mm and wherein the amount of short fibers is at least 3% by weight, based on the total weight of the mixture of long and short fibers. Mounting mats composed of a mixture of long and short fibers in particular include those that have a mixture of long and short glass fibers of the compositions described above. Mounting mats of short and long fibers may have particular advantages, in particular, the cold holding power may be improved and good results can be achieved in a hot vibration test. The present method offers a way to produce these mats in a reliable, reproducible way and low cost and at performance levels equal to or improved to those disclosed in the art.

The present invention includes non-intumescent as well as intumescent mounting mats of a large variety of compositions. An intumescent mat is a mat that contains an intumescent material. As used herein, "intumescent material" means a material that expands, foams, or swells when exposed to a sufficient amount of thermal energy. As used herein, "non-intumescent mat" means a mat that does not contain any intumescent material or at least not enough of an intumescent material to contribute a significant amount to the holding pressure exerted by the mounting mat.

Useful intumescent materials for use in making an intumescent mat include, but are not limited to, unexpanded vermiculite ore, treated unexpanded vermiculite ore, partially dehydrated vermiculite ore, expandable graphite, mixtures of expandable graphite with treated or untreated unexpanded vermiculite ore, processed expandable sodium silicate, for example, that is commercially available under the trade designation "EXPANTROL" (insoluble sodium silicate), from 3M Company, St. Paul, Minn., and mixtures thereof. For purposes of the present application, it is intended that each of the above-listed examples of intumescent materials are considered to be different and distinguishable from one another. Desired intumescent materials include unexpanded vermiculite ore, treated unexpanded vermiculite ore, expandable graphite, and mixtures thereof. An example of a desirable commercially available expandable graphite material is available under the trade designation "GRAFOIL" (Grade 338-50 expandable graphite flake), from UCAR Carbon Co., Inc., Cleveland, Ohio.

The mounting mats in accordance with the present invention may be produced by methods known in the art to produce mounting mats. In a preferred embodiment, the mats are readily produced in a cost effective way in accordance with the third aspect of the invention disclosed above. This method of making mounting mats typically provides one or more of the following advantages. Typically, the method allows to produce mounting mats of a wide variety of compositions in a cost effective and convenient way. In particular, the method allows easy manufacturing of mounting mats including the nanoparticles and that have no or low organic binder content. In particular the method allows to produce the nanoparticle containing mats, including intumescent as well as non-intumescent mats, with no or little binder in an easy, convenient, cost effective and reliable way leading to a consistent quality and performance.

In accordance with the method of the third aspect of the invention, fibers are supplied to a forming box through a fiber inlet of the forming box. A suitable forming box for use in connection with the invention has been disclosed in WO 2005/044529, published May 19, 2005. The forming box includes a plurality of fiber separating rollers arranged in a row and that break apart clumps of fibers. Typically, the fiber separating rollers are spike rollers. The endless belt screen arranged in the forming box has an upper run, which runs immediately below and/or above a row of spike rollers (i.e., for instance between two rows of spike rollers and a lower run in the lower part of the forming box). Accordingly, fiber lumps or oversized fibers are prevented from being laid down on the forming wire and retained on the belt screen in the forming box and transported away from the lower portion of the forming box and returned to the spike rollers for further disintegration. In an embodiment, the endless belt screen provides a sieve or fiber screen member which is self-cleaning since the oversized fibers are retained on one upper side of the lower run of the endless belt screen and released on lower side of the upper run of the endless belt screen because of the vacuum underneath the forming box and the forming wire.

In an embodiment, two rows of spike rollers are provided on each side of the upper run of the belt screen. Hereby, an initial disintegration of the supplied fibers may be provided before the screening by the belt screen and a further disintegration after this first screening. In a further embodiment, the spike rollers in the row immediately below the upper run of the belt screen are positioned with a decreasing distance between their axis of rotation and the belt screen in the direction of travel of the upper run of the belt screen. Hereby, the fiber lumps or clusters of fibers retained on the lower run of the belt screen are gradually re-disintegrated as these retained fibers are returned to the upper part of the belt screen for reprocessing. By starting with a "course" processing of the returned fibers and then gradually reducing the size of the gap between the belt screen and the individual spike rollers, it can be ensured that a lump of returned fibers is disintegrated and not compressed and drawn through a gap between two adjacent spike rollers. Hereby, a better disintegration may be achieved. In order to achieve further disintegration of the fibers and thereby more even distribution, two further rows of spike rollers may be provided on each side of the lower run of the belt screen.

In an embodiment of the invention, the spike rollers are provided along at least one of the vertical runs of the belt screen. Hereby, fibers that are drawn along the belt screen may be re-processed also during the return path and/or the belt screen may be cleaned by the spike rollers provided along the vertical path of the belt screen. In an embodiment of the invention, the belt screen extends beyond the housing in the downstream direction with respect to the travelling direction of the forming wire. Alternatively, the belt screen is provided inside the housing.

The belt screen may be driven with the same or in the opposite direction of movement of the lower run as the underlying forming wire. Moreover, the belt screen may be either continuously driven, (e.g., with a constant speed, or intermittently driven). In one embodiment, two further rows of spike rollers may be provided on each side of the lower run of the belt screen. The belt screen is preferably provided with grid openings in a predetermined pattern.

In one embodiment, the belt screen may be a wire mesh having a predetermined mesh opening. In another embodiment, the belt screen has transversely orientated grid members with openings in between. In an embodiment of the invention, the lower run of the belt screen is immediately above the forming wire so that the belt screen makes contact with the upper side of the fiber formation being air laid on the forming wire. Hereby, the vacuum is screened in some areas in the bottom opening of the forming box and a predetermined surface structure of the laid product may be achieved. These vacuum screened areas are determined by the screen pattern of the belt screen.

In the following, an embodiment of a forming box for use in a preferred method of making the mounting mats is described in more detail with reference to FIGS. 1-3.

In FIG. 1 and FIG. 2, a forming box for use with the method is shown. The forming box comprises a housing 1 into which fibers 3 are supplied from an inlet 2. The forming box is positioned above a forming wire 4 onto which the fibers 3 are air laid due to a vacuum box 5 underneath the forming wire 4 to form a fiberboard 6 in a dry forming process. In FIG. 1, the forming box is shown with the interior elements visible in the housing. However, it is realised that the housing walls may be made either from transparent or opaque materials.

The fibers 3 are blown into the housing 1 of the forming box via the inlet 2. Inside the forming box a number of spike rollers 7 are provided in one or more rows, (e.g. 15 four rows of spike rollers 71, 72, 73, 74 as shown in FIGS. 1 and 2). In the housing, an endless belt screen 8 is also provided. This endless belt screen 8 is provided with a conveying path including an upper run 85, a vertical section 88 where the belt screen 8 moves in a downwards direction, a lower run 86 where the belt screen 8 travels substantially parallel with the underlying forming wire 5 and an upwardly oriented 20 run 87, as shown in FIG. 3.

Adjacent the upper run 85 of the belt screen 8, at least one row of spike rollers 71 is provided. In the embodiment shown two upper rows of spike rollers 71, 72 and two lower rows of spike rollers 73, 74 are provided at different levels in the housing 1. The belt screen is arranged with an upper run path 85 between the two upper rows of spike rollers 71, 72 and the lower run path 86 between the lower rows of spike rollers 73, 74. The fibers 3 may be supplied into the housing 1 in lumps. The spike rollers 7 then disintegrate or shredder the lumps of fibers 3 in order to ensure an even distribution of fibers 3 in the product 6 formed on the forming wire 5. The fibers pass the spike rollers 71 in the first row and then the belt screen 8 and the second row of spike rollers 72 as the fibers are sucked downwards in the forming box. In the lower run 86 of the belt screen 8, oversized fibers are retained on the belt screen 8 and returned to the upper section of the forming box for further disintegration. The retained fibers are captured on the top of the lower run 86 of the belt screen 8 which then become the lower surface of the upper run 85 and the fibers are suck off the belt screen 8 and the lumps of fibers are shredded by the spike rollers one more time.

As shown in FIG. 3, the row of spike rollers 72 immediately below the upper run 85 of the belt screen 8 in inclined. This row 72 receives the retained, "oversized" fibers being returned from the retention below. In order to ensure that the fibers 3 are shredded efficiently in this row 72, the first spike rollers 72', 72", 72''', 72'''' in the row 72 are provided with different distances between the axis of rotation of the individual spike rollers 72', 72", 72''', 72'''' and the upper run 85 of the belt screen 8. The first spike roller 72' in the row is positioned with the largest distance and gradually the subsequent spike rollers 72", 72''' and 72'''' are positioned with closer distances, so that fibers in the lumps of returned, oversized fibers are "peeled" off gently whereby it is ensured that the lumps are shredded and disintegrated rather than being sucked and dragged off the belt screen and in between two adjacent spike rollers.

The endless belt screen 8 includes closed portions 81 and openings 82 provided in a predetermined pattern. Alternatively, the belt screen 8 could be a wire mesh. By a particular pattern of openings 82 and closures 81 of the belt screen 8, a predetermined surface pattern on the fiberboard 6 formed by the dry-forming process may be achieved by arranging the lower run 86 of the belt screen 8 so that it makes contact with the top surface of the fibers which are laid on the forming wire 4.

In the vertically oriented paths of travel 87, 88, one or more spike rollers (not shown) may be provided adjacent the belt screen 8 for loosing fibers on the belt screen. The configuration of the spike rollers may be chosen in accordance with the kinds of fibers which are to be air-laid by the forming box.

The bottom of the forming box may be provided with a sieve 11 (not shown), and the belt screen 8 may accordingly be provided with brush means (not shown) for removing retained fibers. Hereby, the belt may additionally be used for cleaning a bottom sieve. The brush means may be members provided for sweeping the fibers off the upper side of the lower run path of the belt screen. Alternatively or in combination, the belt screen may be provided with means for generating a turbulent airflow stirring up the retained fibers on the sieve. In this manner, a forming box with a bottom sieve may be provided with a cleaning facility for the bottom sieve and the belt may additionally be used for preventing that the sieve is clogging up.

In the above illustrated embodiments, the inlet is shown positioned above the belt screen and the spike rollers. However, it is realised that the inlet may be positioned below the upper run of the belt screen, and/or that a multiple of inlets may be provided, (e.g. for supplying different types of fibers to the forming box). The spike rollers and indeed the belt screen will then assist in mixing the fibers inside the forming box.

In accordance with a preferred method for making the nanoparticle containing mounting mats, the mat of fibers formed on the forming wire is transported out of the forming box and is then compressed to a desired thickness suitable for mounting the mounting mat in the housing of a catalytic converter. The mat should be restrained such that the compressed state of the mounting mat is maintained during further handling, processing (e.g., cutting into a desired shape and size) and mounting of the mat in the catalytic converter. In the manufacturing of a catalytic converter or pollution control device, the mounting mat is disposed in a gap between the housing or casing of the pollution control device and the pollution control element, also called monolith. Typically, the gap between the housing and the pollution control element will vary between 2 mm and 10 mm, for example, between 3 mm and 8 mm. The gap size may be constant or may vary along the circumference of the pollution control element depending on the particular design of the pollution control device.

In accordance with the present invention, in addition to supplying inorganic fibers through an inlet of the forming box, further desired adjuvants used in the composition of the mounting mat may also be supplied through the inlet. In particular, the nanoparticles may be supplied through an inlet of the forming box. Further, in a particular embodiment, intumescent material may be included in and distributed in the fiber mat by supplying the intumescent material through an inlet of the forming box, similar to the way the inorganic fibers is supplied to the forming box. Accordingly, the present method enables the making of an intumescent mat in an easy way at low cost and with a reproducible and consistent performance, even at low binder content. Thus, the present method enables the making of intumescent mounting mats that contain no organic binder (e.g., that are needle punched) or that have an organic binder content of not more than 5% by weight, based on the weight of the mounting mat.

The inorganic nanoparticles may also be included in the mounting mat by spraying a dispersion thereof in a suitable liquid such as water or an alcohol onto the fibers before or during forming of the mat. Still further, the nanoparticles may be sprayed after forming the mat before or after compression thereof.

Figure 4:
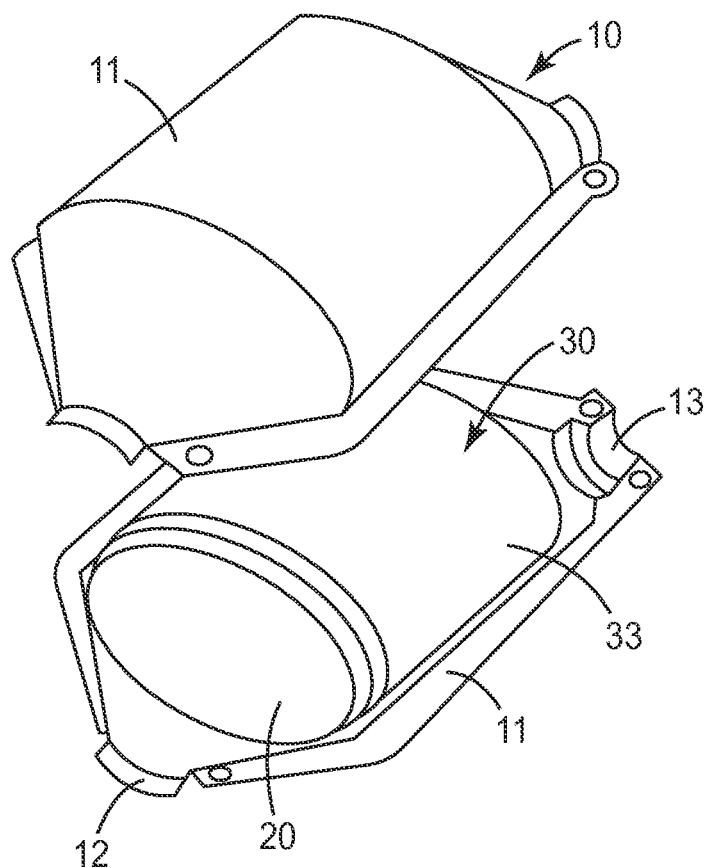
FIG. 4 shows a schematic view of a pollution control device.

In FIG. 4 there is illustrated an embodiment of a pollution control device. Pollution control device 10 comprises a casing 11, typically made of a metal material, with generally frusto-conical inlet and outlet ends 12 and 13, respectively. Disposed within casing 11 is a pollution control element or monolith 20. Surrounding pollution control monolith 20 is mounting mat 30 produced in accordance with the present method and which serves to tightly but resiliently support monolithic element 20 within the casing 11. Mounting mat 30 holds pollution control monolith 20 in place in the casing and seals the gap between the pollution control monolith 20 and casing 11 to thus prevent or minimize exhaust gases from by-passing pollution control monolith 20. As can be seen from FIG. 4, the exterior of casing 11 is exposed to the atmosphere. In other words, the device 10 does not include another housing in which the casing 11 is housed. In another embodiment however, the pollution control monolith may be held in a casing and one or more of these may then be housed in a further casing as may be the case for example in catalytic converters for trucks. The casing of a pollution control device can be made from materials known in the art for such use including stainless steel, etc.

Pollution control elements that can be mounted with the mounting mat include gasoline pollution control monoliths as well as diesel pollution control monoliths. The pollution control monolith may be a catalytic converter, a particulate filter or trap, or the like. Catalytic converters contain a catalyst, which is typically coated on a monolithic structure mounted within a metallic housing. The catalyst is typically adapted to be operative and effective at the requisite temperature. For example for use with a gasoline engine the catalytic converter should be effective at a temperature of 400° C. to 950° C. whereas for a diesel engine lower temperatures, typically not more than 350° C. are common. The monolithic structures are typically ceramic, although metal monoliths have also been used. The catalyst oxidizes carbon monoxide and hydrocarbons and reduces the oxides of nitrogen in exhaust gases to control atmospheric pollution. While in a gasoline engine all three of these pollutants can be reacted simultaneously in a so-called "three way converter", most diesel engines are equipped with only a diesel oxidation catalytic converter. Catalytic converters for reducing the oxides of nitrogen, which are often used in diesel trucks today, generally consist of a separate catalytic converter.

Examples of pollution control monoliths for use with a gasoline engine include those made of cordierite that are commercially available from Corning Inc., Corning, N.Y. or NGK Insulators, LTD., Nagoya, Japan or metal monoliths commercially available from Emitec, Lohmar, Germany. For additional details regarding catalytic monoliths see, for example, "Advanced Ceramic Substrate: Catalytic Performance Improvement by High Geometric Surface Area and Low Heat Capacity," Umehara et al., Paper No. 971029, SAE Technical Paper Series, 1997; "Systems Approach to Packaging Design for Automotive Catalytic Converters," 10 Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974.

Diesel particulate filters or traps are typically wall flow filters, which have honeycombed, monolithic structures typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust gas are collected. Suitable diesel particulate filters made of cordierite are commercially available from Corning Inc., Corning N.Y., and NGK Insulators Inc., Nagoya, Japan. Diesel particulate filters made of Silicon Carbide are commercially available from Ibiden Co. Ltd., Japan and are described in, for example, JP 2002047070A, published Feb. 12, 2002.

The mounting mat can be used to mount so-called thin wall or ultra-thin wall pollution control monoliths. In particular, the mounting mat can be used to mount pollution control monoliths that have from 400 cpsi (62 cells per square centimeter (cpscm) to 1200 cpsi (186 cpscm) and that have wall thickness of not more than 0.005 inch (0.127 mm). Examples of pollution control monoliths that may be mounted with the mounting mat include thin wall monoliths 4 mil/400 cpsi (102 micrometers/62 cells per square centimeter (cpscm) and 4 mil/1600 cpsi (102 micrometers/148 cpscm) and ultra-thin wall monoliths 3 mil/600 cpsi (76 micrometers/93 cpscm), 2 mil/900 cpsi (51 micrometers/140 cpscm) and 2 mil/1200 cpsi (51 micrometers/186 cpscm).

The fiber mat may be compressed and restrained in a number of different ways including needling, stitch-bonding, resin bonding, applying pressure and/or combinations thereof. Preferably, the compressed and restrained fiber mat has a weight per unit area value in the range from about 800 g/m$^2$ to about 3000 g/m$^2$, and in another aspect a thickness in the range from about 0.5 cm to about 3 cm. Typical bulk density under a 5 kPA load is in the range 0.1 g/cm$^3$ to 0.2 g/cm$^3$. A mat containing intumescent materials may have a weight per area in the range from about 2000 to 8000 g/m$^2$ and/or a bulk density under a 5 kPa load in the range of 0.3 g/cm$^3$ to 0.7 g/m$^2$.

In one embodiment the fiber mat is compressed and restrained by needle punching. A needle punched mat refers to a mat wherein there is physical entanglement of fibers provided by multiple full or partial (preferably, full) penetration of the mat, for example, by barbed needles. The fiber mat can be needle punched using a conventional needle punching apparatus (e.g., a needle puncher commercially available under the trade designation "DILO" from Dilo, Germany, with barbed needles (commercially available, for example, from—Beckert-Albstadt, Germany) to provide a needle-punched fiber mat. Needle punching, which provides entanglement of the fibers, typically involves compressing the mat and then punching and drawing barbed needles through the mat. The optimum number of needle punches per area of mat will vary depending on the particular application. Typically, the fiber mat is needle punched to provide about 1 to about 60 needle punches/cm$^2$. Preferably, the mat is needle punched to provide about 5 to about 20 needle punches/cm$^2$.

The fiber mat can be stitchbonded using conventional techniques (see e.g., U.S. Pat. No. 4,181,514 (Lefkowitz et al.), the disclosure of which is incorporated herein by reference for its teaching of stitchbonding nonwoven mats). Typically, the mat is stitchbonded with organic thread. A thin layer of an organic or inorganic sheet material can be placed on either or both sides of the mat during stitchbonding to prevent or minimize the threads from cutting through the mat. Where it is desired that the stitching thread not decompose in use, an inorganic thread, such as ceramic or metal (e.g., stainless steel) can be used. The spacing of the stitches is usually from 3 mm to 30 mm so that the fibers are uniformly compressed throughout the entire area of the mat.

In another embodiment, the mat may be compressed and restrained through resin bonding. Typically, in resin bonding, the mat is impregnated or saturated with an organic binder solution, compressed by apply pressure and the solvent of the binder solution is then removed such that the method is retained at about its compressed thickness. As the organic binder, any binders composed of an organic compound can be usable in the present method without particular limitations, as far as the binders can maintain the compressed thickness of the compressed mat at an ordinary temperature, and the thermal decomposition thereof permits restoration of the original thickness of the mat. It is preferred that the organic binder be readily thermally decomposed and dissipated (destroyed) from the mat at a temperature at which the catalytic converter is intended to be used. Further, since the mounting is exposed generally to a temperature of not less than 300° C. or to a temperature of 900° C. to 1000° C. for a high-temperature use, it is preferred that the organic binder be thermally decomposed for a short period of time so as to lose its function as a binder at a temperature of about 500° C. or lower. More preferably, the organic binder is dissipated at the temperature range from the mat upon the thermal decomposition.

As the organic binders, various rubbers, water-soluble polymer compounds, thermoplastic resins, thermosetting resins or the like are exemplified. Examples of the rubbers include natural rubbers; acrylic rubbers such as copolymers of ethyl acrylate and chloroethyl-vinyl ether, copolymers of n-butyl acrylate and acrylonitrile or the like; nitrile rubbers such as copolymers of butadiene and acrylonitrile or the like; butadiene rubbers or the like. Examples of the water-soluble polymer compounds include carboxymethyl cellulose, polyvinyl alcohol or the like. Examples of the thermoplastic resins include acrylic resins in the form of homopolymers or copolymers of acrylic acid, acrylic acid esters, acrylamide, acrylonitrile, methacrylic acid, methacrylic acid esters or the like; an acrylonitrile-styrene copolymer; an acrylonitrile-butadiene-styrene copolymer or the like. Examples of the thermosetting resins include bisphenol-type epoxy resins, novolac-type epoxy resins or the like.

The afore-mentioned organic binders may be used in the form of an aqueous solution, a water-dispersed emulsion, a latex or a solution using an organic solvent. These organic binders are hereinafter referred to generally as a "binder liquid".

Resin bonding may also be accomplished by including a polymeric material for example in the form of a powder or fiber into the mat, compressing the mat by exerting pressure thereon and heat treating the compressed mat so as to cause melting or softening of the polymeric material thereby bonding fibers in the mat and thus restraining the mat upon cooling.

Suitable polymeric materials that may be included in the mat include thermoplastic polymers including polyolefines, polyamides, polyesters, vinyl acetate ethylene copolymers and vinylester ethylene copolymers. Alternatively, thermoplastic polymeric fibers may be included in the mat. Examples of suitable thermoplastic polymeric fibers include polyolefin fibers such as polyethylene, or polypropylene, polystyrene fibers, polyether fibers, polyester fibers such as polyethylene terephthalate (PET) or polybutaline terephthalate (PBT), vinyl polymer fibers such as polyvinyl chloride and polyvinylidene fluoride, polyamides such as polycaprolactam, polyurethanes, nylon fibers and polyaramid fibers. Particularly useful fibers for thermal bonding of the fiber mat include also the so-called bicomponent fibers which typically comprise polymers of different composition or with different physical properties. Typically, these fibers are core/sheath fibers where for example the polymeric component of the core provides structure and the sheath is meltable or thermoplastic enabling bonding of the fibers. For example, in one embodiment, the bicomponent fiber may be a core/sheath polyester/polyolefin fiber. Bicomponent fibers that can be used include those available under the trade designation "TREVIRA 255" from Trevira GmbH, Bobingen, Germany and "FIBERVISION CREATE WL" from FiberVisions a/s, Varde, Denmark.

In a particular embodiment, two or more fiber mat layers (one or both of which may contain nanoparticles) may be formed on top of one another. For example, in one embodiment of such co-forming, the method comprises forming a first mat of fibers by performing steps (i) to (iv) of the method described above, forming at least one second mat of fibers on the first mat by repeating steps (i) to (iv) with the first mat being provided on the forming wire and carrying out step (v) of the method (i.e. compressing and restraining) so as to obtain a mounting having a first and second mat of fibers. According to an alternative embodiment, the first mat of fibers is first compressed and restrained before forming the second mat layer thereon.

For particular formulations or compositions of mounting mat, it may be desired to stabilize the mounting mat. Such may be particularly desirable for mounting mats that have a low organic binder content or none at all or that have unbonded particulate material distributed in the fiber mat. For example, in one embodiment to stabilize the mounting mat, it may be desirable to coat or impregnate the surface on one or both sides of the mounting mat by spraying thereon an organic binder solution. According to another embodiment, a fiber mat may be co-formed on one or both sides of a mounting mat (using a method of coforming as described above) that contains no or little organic binder and/or that contains particulate material distributed therein. The fiber mats that are being coformed on either or both sides of such a mat may contain a relatively large proportion of thermoplastic polymer material in the form of powder or fiber. Following heating, this polymeric material is caused to melt, thereby forming a fiber mat layer on either or both sides that may protect dislodging of fibers or loss of particulate material during handling of the mounting mat.

In a particular embodiment in connection with the present invention the mounting mat may include one or more further layers. In particular, the mounting mat may contain one or more layers selected from the group consisting of scrims and nettings. The scrim or netting typically is a thin layer having an area weight of between 10 g/m² and 150 g/m², for example between 15 g/m² and 100 g/m² or between 20 g/m² and 50 g/m². Generally the weight of the scrim or netting in a mounting mat is small compared to the overall weight of the mounting mat. Generally, the weight percentage of a netting or scrim in the mounting mat is between 1% and 10% by weight, for example between 2% and 6% by weight. A netting for use in connection with the present invention typically comprises polymeric fibers and/or inorganic fibers arranged in a generally regular way. For example, in one embodiment, the fibers may be parallel to each other. In another embodiment, fibers may be arranged in parallel in two orthogonal directions thereby crossing each other and defining square or rectangular spaces between them. A scrim for use in connection with the present invention typically is a non-woven having a random orientation of fibers. The fibers of a scrim may contain any of the inorganic fibers disclosed above as well as any type of polymeric fibers, in particular the thermoplastic polymeric fibers disclosed above.

In one embodiment, a layer of scrim or netting may be included within the body of the mounting mat for the purpose of reinforcing the mounting mat.

In a still further embodiment, a scrim layer or netting may be provided on one or both sides of the mounting mat. Conveniently, this can be done by supplying the scrim or netting on the forming wire of forming machine described above. A further scrim or netting may be provided on the formed fiber mat if needed or desired and the mat and scrim(s) or netting(s) may then be needle punched or stitchbonded together. According to a further embodiment, the scrim or scrims (or netting or nettings) may be coated with an organic binder material or the scrim/netting itself may comprise thermoplastic polymeric fibers. Accordingly, following a subsequent heat treatment, the organic binder or thermoplastic fibers may form a film or bond to the fibers of the fiber mat.

In a particular embodiment, an organic binder is applied on one or both sides of the mat to reduce or minimize fiber shedding. Such an organic binder may be powder coated or sprayed on one or both opposite major surfaces of the mat for a solution or dispersion in an appropriate liquid medium. Furthermore, as described below, the coating so applied may be selected so as to also adjust the frictional properties of the mat.

In a particular embodiment of the present invention, the mounting mats may be impregnated. In one embodiment, the fibers of the fiber mat are impregnated with one or more of an organosilicon compound selected from the group consisting of siloxane compounds, preferably silsesquioxanes, hydrolysates and condensates, preferably self-condensates, of these compounds, and combinations thereof. A hydrolysate and/or a condensate, particularly a self-condensate, of a siloxane compound sometimes can be formed, for example, in an aqueous solution of said siloxane, in particular, if said aqueous solution is not immediately but only some hours later applied. The siloxane compound, after drying, generally forms a very thin continuous or discontinuous coating on the fibers. Examples of siloxane compounds which can be used for impregnating the fibers are organosiloxanes such as silsesquioxanes, copolymers (co-condensates) thereof and hydrolysates thereof, polyorganosiloxanes such as polydiorganosiloxanes, and hydrolysates thereof, and combinations thereof. In a particular embodiment, the organosiloxane (e.g., the silsesquioxane or the polyorganosiloxane) comprises one or more functional groups which are capable for a self-condensation reaction under the desired impregnation conditions, such as a hydroxy group, an alkoxy group such as methoxy, ethoxy, propoxy, butoxy, and the like known functional groups for a self-condensation reaction. Such groups are preferably positioned at a terminal position of the organosiloxane, but can also be located on a side chain, preferably at the terminal position thereof. Particularly preferable are silsesquioxanes as described below, preferably having one or more functional groups for a self-condensation reaction, as mentioned above, at a terminal position of the main chain or a side chain.

The term "silsesquioxanes" (also referred to as silasesquioxanes) as used herein includes silsesquioxanes as well as silsesquioxane copolymers (co-condensates). Silsesquioxanes per se are silicon-oxygen compounds wherein each Si atom is bound to an average of 3/2 (sesqui) O atoms and to one hydrocarbon group, having the general formula (I)

$$R_{2n}Si_{2n}O_{3n} \qquad (I)$$

wherein

R is H or an organic residue having preferably from 1 to 20, more preferably, 1 to 12 carbon atoms, and n is an integer of 1 to 20, preferably 2 to 15, more preferably, 3 to 12, and even more preferably, 4 to 12. Preferably, the silsesquioxane used for impregnating the fiber blanket is solid at room temperature (23° C.±2° C.). Furthermore, the silsesquioxane preferably comprises a functional group, such as hydroxy or alkoxy group, at a terminal position, which can self-crosslink under the desired impregnation conditions as indicated below. They can in principle be obtained by e.g. hydrolytic condensation of trifunctional (e.g., trialkoxy-functional) silanes (e.g., R—Si(OR)$_3$).

In the above formula (I), R is an organic group or substituted organic group preferably containing from 1 to 20, more preferably 1 to 12, even more preferably 1 to 8 carbon atoms, and optionally one or more, preferably 1 to 5, heteroatoms selected from nitrogen, oxygen and sulfur, preferably nitrogen and oxygen. R of the silsesquioxane can be an alkyl, alkenyl, alkynyl, cycloalkyl, aryl, alkaryl or an aralkyl group, and these groups optionally can contain 1 to 5 heteroatoms such as nitrogen or oxygen. These groups optionally can contain one or more substituents such as amino, mercapto, hydroxyl, alkoxy, epoxy, acrylato, cyano and carboxy groups, wherein preferred substituents are amino, mercapto, epoxy or $C_1$-$C_8$-alkoxy groups.

Specific illustrative examples of R are $C_1$-$C_8$-alkyl such as methyl, ethyl, propyl, butyl, pentyl, hexyl, and heptyl; $C_2$-$C_8$-alkenyl such as vinyl, allyl, butenyl and hexenyl; $C_2$-$C_8$-alkynyl such as ethinyl and propinyl; $C_3$-$C_8$-cycloalkyl such as cyclopentyl, cyclohexyl and cycloheptyl; $C_1$-$C_8$-alkoxy such as methoxy, ethoxy, propoxy, butoxy, pentoxy and hexoxy; $C_2$-$C_8$-alkenoxy such as ethylenoxy, propylenoxy and butylenoxy; propargyl; optionally substituted aryl having 6 to 12 carbon atoms such as phenyl, tolyl, benzyl and naphthyl; $R^1$—(O—$R^2$)$_n$— or $R^3$—(NR$^5$—$R^4$)$_n$—, wherein $R^1$ to $R^4$ is independently an optionally substituted, saturated or unsaturated hydrocarbon group having up to 8 carbon atoms, preferably selected from the groups as mentioned above, $R^5$ is hydrogen or $C_1$-$C_8$ alkyl and n is 1 to 10; and all representatives of the above mentioned groups substituted by one or more amino, hydroxyl, mercapto, epoxy or $C_1$-$C_8$-alkoxy groups. From the above mentioned groups, optionally substituted $C_1$-$C_8$-alkyl, optionally substituted aryl having 6 to 12 carbon atoms, and $R^1$—(O—$R^2$)$_n$— or $R^3$—(N$R^5$—$R^4$)$_n$—, wherein $R^1$ to $R^4$ is independently an optionally substituted, saturated or unsaturated hydrocarbon group having up to 8 carbon atoms, preferably selected from the groups as mentioned above, $R^5$ is hydrogen or $C_1$-$C_8$ alkyl and n is 1 to 10, wherein the optional substituent is selected from amino, hydroxyl, mercapto, epoxy or $C_1$-$C_8$-alkoxy groups, is particularly preferred.

Further illustrative examples of the R are 3,3,3-trifluoropropyl, dichlorophenyl, aminopropyl, aminobutyl, $H_2NCH_2CH_2NH(CH_2)_3$—,
  $H_2NCH_2CH_2NHCH_2CH(CH_3)CH_2$—, mercaptopropyl, mercaptoethyl, hydroxypropyl,

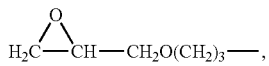

$CH_2$=CHCOO(CH$_2$)$_3$—, $CH_2$=C(CH$_3$)COO(CH$_2$)$_3$—, cyanopropyl, cyanoethyl, carboxyethyl and carboxyphenyl groups. Of course, the substituents on the hydrocarbon residues should not be reactive with water. The methyl, ethyl, propyl, the aminomethyl, aminoethyl and aminopropyl, and mercaptoethyl and mercaptopropyl groups are preferred when a single silsesquioxane is used. When R is other than a methyl or mercaptopropyl it is preferred that the silsesquioxane be copolymerized with methyl silsesquioxane in a weight ratio of from 5 to 30:70 to 95, i.e., 5 to 30% by weight of $RSiO_{3/2}$ units and 70 to 95% by weight of $CH_3SiO_{3/2}$ units.

Silsesquioxanes that may be used in the present invention generally have a low average molecular weight (Mw), wherein Mw preferably is in the range of up to 10,000, preferably, 200 to 6000 and still more preferably 250 to 5000 and 300 to 4000, determined by Gel Permeation Chromatography (GPC) using a polystyrene standard. GPC test methods are further explained in "Modern Size Exclusion Liquid Chromatography" Practice of Gel Permeation Chromatography, John Wiley and Sons, 1979. Useful silsesquioxanes are described in U.S. Pat. No. 3,493,424 (Mohrlok et al.); U.S. Pat. No. 4,351,736 (Steinberger et al.); and U.S. Pat. No. 4,781,844 (Kortmann et al.), each incorporated herein by reference.

Silsesquioxane copolymers (co-condensates) include copolymers or co-condensates of silsesquioxane polymers of the formula $R^{11}SiO_{3/2}$ or of $R^{11}$—Si(O$R^{12}$)$_3$ with diorganooxysilanes (or hydrosylates thereof) of the formula $R^{11}_2$Si(O$R^{12}$)$_2$ and/or tetraorganooxysilanes (or hydrosylates thereof) of the formula Si(O$R^{12}$)$_4$ wherein each $R^{11}$ is as defined above for group R and preferably each $R^{11}$ represents an unsubstituted or substituted hydrocarbon radical having 1 to 12, preferably 1 to 8 carbon atoms, substituents of which may be amino, mercapto and epoxy groups, and $R^{12}$ is independently an alkyl group of 1 to 8, preferably 1 to 4 carbon atoms. The silsesquioxane may optionally further comprise a co-condensate of silanes of the formula $R^{11}_3$SiO$R^{12}$. Preferred silsesquioxane polymers are neutral or anionic. Useful silsesquioxanes can be made by the techniques described in U.S. Pat. No. 3,493,424 (Mohrlok et al.), U.S. Pat. No. 4,351,736 (Steinberger et al.), U.S. Pat. No. 5,073,442 (Knowlton et al.), and U.S. Pat. No. 4,781,844 (Kortmann et al).

Mixtures of silsesquioxanes and of silsesquioxane copolymers can also be employed, if desired. The silsesquioxane should typically be solid, i.e. it is neither gaseous nor liquid at room temperature (23° C.±2° C.). The silsesquioxanes can be used as colloidal suspension. The silsesquioxanes may be prepared by adding silanes to a mixture of water, a buffer, a surfactant and optionally an organic solvent, while agitating the mixture under acidic or basic conditions. The surfactant used in the silsesquioxane preparation should be either anionic or cationic in nature. Best results are generally obtained with the cationic suspensions. It is preferable to add the quantity of silane uniformly and slowly in order to achieve a narrow particle size. The average particle size of the silsesquioxanes in the colloidal suspension should be within the range of 1 nm to 100 nm (10 Angstroms to 1000 Angstroms), preferably in the range of 1 nm to 50 nm (10 Angstroms to 500 Angstroms) or in the range of 1 nm to 40 nm (10 Angstroms to 400 Angstroms), and more preferably in the range of 20 nm to 50 nm (200 Angstroms to 500 Angstroms). The exact amount of silane that can be added depends on the substituent R and whether an anionic or cationic surfactant is used.

Silsesquioxane copolymers in which the units can be present in block or random distribution are formed by the simultaneous hydrolysis of the silanes. The preferred amount of the silanes of the formula Si(O$R^2$)$_4$, including hydrosylates thereof (e.g. of the formula Si(OH)$_4$), added is 2 to 50 wt. %, preferably 3 to 20 wt. %, relative to the weight of the silanes employed. The amount of tetraorganosilanes, including tetraalkoxysilanes and hydrosylates thereof (e.g. of the formula Si(OH)$_4$) present in the resulting composition is preferably less than 10 wt. %, preferably less than 5 wt. %, more preferably less than 2 wt. % relative to the weight of the silsesquioxane.

The following silanes are e.g. useful in preparing the silsesquioxanes of the present invention: methyltrimethoxysilane, methyltriethoxysilane, methyltriisopropoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane and 2-ethylbutoxytriethoxysilane.

Preferably, the hydroxy number is from about 1000 to 6000 per gram, and is more preferably from about 1500 to 2500. The hydroxy number may be measured, for example, by titration or the molecular weight may be estimated by $^{29}$Si NMR.

A useful silsesquioxane containing essentially no residual tetraalkyoxysilanes (or hydrosylates thereof such as Si(OH)$_4$) (available under the trade designation "SR 2400 RESIN" from Dow Corning, Midland, Mich.). A particularly preferred example of a silsesquioxane is available under the trade designation "DRI-SIL 55" from Dow Corning, which is 98 wt. % (3-(2-aminoethyl)aminopropyl)-methylsesquioxane having methoxy at the terminus, in methanol.

In a further embodiment, the siloxane compound is a polyorganosiloxane, preferably a polydiorganosiloxane. Preferably, the polyorganosiloxane used for impregnating the fiber mat is solid at room temperature (23° C.±2° C.). Furthermore, the polyorganosiloxane preferably comprises a functional group, such as hydroxy or alkoxy, at a terminal position, which can self-crosslink under the desired impregnation conditions as indicated below. Polyorganosiloxanes preferably used in the present invention have a low average molecular weight (Mw), wherein Mw preferably is in the range of up to 10,000, preferably, 200 to 6000 and still more preferably, 250 to 5000 and 300 to 4000, determined by Gel Permeation Chromatography (GPC) using a polystyrene standard. For example, a polyorganosiloxane, preferably a polydiorganosiloxane, can be used in which at least about 50% of the total silicon-bonded substituents are methyl groups and any remaining substituents are other monovalent hydrocarbon groups such as the higher alkyl groups (having, for example, 4 to 20 carbon atoms), for example, tetradecyl and octadecyl, phenyl groups, vinyl groups and allyl groups, and monovalent hydrocarbonoxy and substituted hydrocarbon groups, for example, alkoxy groups, alkoxy-alkoxy groups, fluoroalkyl groups, hydroxyalkyl groups, aminoalkyl and polyamino (alkyl) groups, mercaptoalkyl groups and carboxyalkyl groups. Specific examples of such hydrocarbonoxy and substituted hydrocarbon groups are methoxy, ethoxy, butoxy, methoxyethoxy, 3,3-trifluoro-propyl, hydroxymethyl, aminopropyl, beta-aminoethyl-gamma-aminopropyl, mercaptopropyl and carboxybutyl. In addition to the aforementioned organic substituents the organosiloxane may have silicon-bonded hydroxyl groups (normally present in terminal silanol groups), or silicon-bonded hydrogen atoms as in, for example, the poly(methylhydrogen) siloxanes and copolymers of dimethylsiloxane units with methylhydrogensiloxane units and/or dimethylhydrogensiloxane units.

In some cases the polyorganosiloxane, such as the polydiorganosiloxane, may comprise two or more different types of siloxanes, or it may be employed in conjunction with other organosilicon compounds. For example, the polyorganosiloxane may comprise both a silanol-terminated polydimethylsiloxane and a crosslinking agent therefore such as a poly(methylhydrogen) siloxane, an alkoxy silane (e.g., $CH_3Si(OCH_3)_3$ and/or $NH_2CH_2CH_2NH(CH_2)_3Si(OC_2H_5)_3$) or partial hydrolysates and condensates of such silanes. Thus, any of a wide range of organosiloxanes may be employed as polyorganosiloxane depending on the properties. Generally preferred as polyorganosiloxanes, e.g., polydiorganosiloxanes, are polyorganosiloxanes having terminal silicon-bonded reactive groups, for example, hydroxyl and alkoxy groups, employed either alone or in combination with other organosiloxane compounds. The above polyorganosiloxane, e.g. a polydiorganosiloxane, can also be used in combination with an organosilane of the general formula (II)

wherein each Y represents a monovalent group having less than 6 carbon atoms selected from hydrocarbon groups, alkoxy groups and alkoxyalkoxy groups, at least one Y being alkoxy or alkoxyalkoxy, R represents a divalent group having from 3 to 10 carbon atoms, the said group being composed of carbon, hydrogen and, optionally, oxygen present in the form of ether linkages and/or hydroxyl groups, R' represents a monovalent hydrocarbon group having from 1 to 15 carbon atoms or the group $(—OQ)_aOZ$, wherein Q represents an alkylene group having 2 or 3 carbon atoms, a has a value of from 1 to 20 and Z represents a hydrogen atom, an alkyl group or an acyl group, each R" represents a methyl or an ethyl group and X represents a halogen atom.

In the above specified general formula (II) the divalent group R is composed of carbon and hydrogen or carbon, hydrogen and oxygen, any oxygen being present in the form of ether linkages and/or hydroxyl groups. The group R may therefore be, for example, methylene, ethylene, hexylene, xenylene, —$CH_2CH_2OCH_2CH_2$— and —$(CH_2)_2OCH_2CH(OH)CH_2$—. Preferably, R represents the groups —$(CH_2)_3$—, —$(CH_2)_4$— or —$CH_2CH(CH_3)CH_2$—. The R' group may be any monovalent hydrocarbon group having from 1 to 15 carbon atoms, for example, an alkyl group, e.g., methyl, ethyl, propyl, butyl or tetradecyl, an alkenyl group, e.g., vinyl, or an aryl, alkaryl or aralkyl group, e.g., phenyl, naphthyl, tolyl, 2-ethylphenyl, benzyl and 2-phenylpropyl. The R' group may also be the group —$(OQ)_aOZ$ as hereinabove defined, examples of such groups being —$(OCH_2CH_2)OH$, —$(OCH_2CH_2)_3OH$, —$(OCH_2CH_2)_3(OCH_2CH_2CH_2)_3OC_4H_9$ and —$(OCH_2CH_2)_2OC_3H_7$. As the Y substituents there may be present monovalent hydrocarbon groups such as methyl, ethyl, propyl and vinyl, and alkoxy and alkoxyalkoxy groups, for example, methoxy, ethoxy, butoxy and methoxyethoxy. At least one Y should be alkoxy or alkoxyalkoxy, the preferred silanes being those wherein the Y substituents are selected from methyl groups and alkoxy or alkoxyalkoxy groups having less than 4 carbon atoms. Preferably, X represents chlorine or bromine. The above organosilanes are known substances and can be prepared for example by the reaction of a tertiary amine, for example, $C_{15}H_{31}N(CH_3)_2$, with a haloalkylsilane, for example, chloropropyltrimethoxysilane, or by the addition of an unsaturated amine to a hydrosilicon compound followed by reaction of the product with a hydrocarbyl halide or a hydrogen halide.

In a further embodiment of the invention, the fibers can be impregnated with an organosilicon compound selected from an alkoxy group-containing silane, preferably an optionally substituted alkyl- or aryl-alkoxysilane, more preferably an optionally substituted alkyl- or aryl-trialkoxysilane of the formula $RSi(OR')_3$, a hydrolysate and a condensate thereof, and combinations thereof. If R is alkyl, the alkyl group preferably contains 1 to 20, more preferably, 1 to 16, even more preferably, 1 to 10 or 1 to 8 carbon atoms. Preferred alkyl groups are methyl, ethyl, propyl, methylethyl, butyl, pentyl, hexyl, and cyclohexyl. If R is aryl, the aryl group is preferably phenyl. The alkoxy group OR' preferably contains 1 to 12, more preferably, 1 to 8, even more preferably, 1 to 6 carbon atoms. Preferred alkoxy groups are methoxy and ethoxy, also 2-methoxyethoxy and isopropoxy are useful. The alkoxy groups are selected independently from each other. The optional substituent is preferably selected from amino, optionally further substituted with, for example, $C_1$-$C_6$-alkyl or amino-$C_1$-$C_6$-alkyl; epoxy, 3-glycidyloxy, 3-(meth)acryloxy, mercapto and $C_1$-$C_6$-alkoxy groups. In a preferred embodiment only the alkyl group is substituted. A hydrolysate and/or a condensate, particularly a self-condensate, of such an alkoxy group-containing silane compound can be formed, for example, in an aqueous solution of said silane, in particular, if said aqueous solution is not immediately but only some hours later applied.

Examples of trialkoxysilanes are methyltrimethoxysilane, methyltriethoxysilane, methyltriisopropoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane, 2-ethylbutoxytriethoxysilane, phenyltriethoxysilane, cyclohexyltriethoxysilane, methacryloxytrimethoxysilane, glycidoxytrimethoxysilane, and N-(2-aminoethyl)-3-aminopropyltrimethoxysilane. Examples of alkyl- or phenyl-trialkoxysilanes are commercially available under the trade designation "DYNASYLAN" from Degussa, Frankfurt, Germany, an example of which is "DYNASYLAN PTMO", which is a propyltrimethoxysilane.

Impregnation materials also include blends of trialkoxysilanes as mentioned above with tetraalkoxysilanes of the formulae $Si(OR)_4$ or $Si(OR)_3OR'$ or $Si(OR)_2(OR')_2$, wherein R and R' are an optionally substituted alkyl group preferably, containing 1 to 20, more preferably, 1 to 16, even more preferably, 1 to 10 or 1 to 8 carbon atoms. Preferred alkyl groups are methyl, ethyl, propyl, methylethyl, butyl, pentyl, hexyl, and cyclohexyl. The optional substituent is preferably selected from amino, optionally further substituted with e.g. $C_1$-$C_6$-alkyl or amino-$C_1$-$C_6$-alkyl; epoxy, 3-glycidyloxy, 3-(meth)acryloxy, mercapto and $C_1$-$C_6$-alkoxy groups.

The mat may be impregnated with any of the above materials before or after compression and restraining of the fiber mat. Still further, it is also possible to impregnate the fibers before they are being supplied to the forming box.

In a further embodiment, a thin continuous or discontinuous coating of a high friction coating material is formed on the internal surface (i.e., the surface of the mounting mat to be contacted with the pollution control element) and optionally the external surface (i.e., the surface of the mounting mat to be contacted with the housing) of the mounting mat. The high friction coating is applied such that the high friction coating material does not essentially invade the mounting mat. Furthermore, the internal surface and optionally the external surface of the mounting mat is coated with a high friction coating such that the coefficient of friction between the optionally coated external surface of the mounting mat and the housing is lower than the coefficient of friction between the coated internal surface of the fiber mat and the catalyst element. The organic portion of the high friction coating decomposes and dissipates partly or completely under typical operating conditions of the catalyst element. The high friction coating of the external surface can be the same as or can be different to the high friction coating of the internal surface of the mounting mat. To obtain the desired mounting characteristics, precaution must be taken so that there is a difference in the impregnation amount between the side of the external surface and the side of the internal surface of the mounting mat, if the same coating material is used on both surfaces. For impregnation with the same high friction coating, the solid component content of the coating material with which the side of the internal surface is impregnated should therefore be larger than that of the coating material with which the side of the external surface is impregnated. It has been shown that excellent stuffing results can be achieved when the friction difference between both sides is maximized. Although there is no specific restriction on the difference of the content of the high friction coating on the mounting mat, the solid component content of the high friction coating on the side of the internal surface of the mounting mat is preferably from about 5 g/m² to 100 g/m², more preferably from about 20 g/m² to 50 g/m². On the other hand, the solid component content of the high friction coating on the external surface of the mounting mat is preferably from about 0.5 g/m² to 10 g/m².

The high friction coating typically serves to improve the behaviour e.g. during the stuffing of catalyst, which is a commonly used canning method. The high friction coating is chosen to provide anti-skid properties on the surface of the catalyst element to avoid slippage of the mat during canning. The coating can be selected from natural or synthetic polymeric materials, preferably a resin or rubber material such as an acrylic resin or rubber such as an acrylic acid ester copolymer, a nitrile resin or rubber, a vinylacetate copolymer, a polystyrene resin, an acrylate-styrene copolymer, a styrene-butadiene resin, a SIS block copolymer, an EPDM, an ABS, a PE or PP film, etc., and combinations thereof. Many of these organic polymeric materials provide excellent anti-skid properties. Some of these organic polymers can soften at elevated temperatures, which can lead to reduced holding performance in a certain temperature/time window before the organic polymeric material degrades and disappears. Inorganic coatings such as silica-, alumina-, and clay-gels or particle slurries, etc. can be used, but may sometimes have lower anti-slip properties compared to organic polymeric material. Their advantage is that they do not decompose at higher temperatures and therefore provide a permanent friction increase leading to an increased mat holding performance. A further optimization of the holding performance can be achieved by putting an inorganic high friction coating on the housing side of the mat, which does not change the stuffing performance significantly, but leads to increased friction and mat holding performance.

In a particular embodiment the high friction coating composition is composed of a latex that can be decomposed and dissipated at arbitrary reactions taking place under high temperature conditions applicable during operation of the catalytic converter. Usable latex herein includes a colloidal dispersion obtained by dispersing a natural or synthetic polymer material, preferably a resin material such as an acrylic acid ester copolymer, a vinylacetate copolymer, a polystyrene resin, an acrylate-styrene copolymer, a styrene-butadiene resin, and combinations thereof, into an aqueous medium or another medium, or an organic material such as a poly(vinyl alcohol). Optionally, the latex further comprises in admixture thereto one or more of a silica-, alumina-, or clay particles. Acrylic latex for which an acrylic resin is used can be particularly advantageously used. Examples of preferred lattices are vinylacetate-ethylene polymer dispersion available under the trade designation "AIRFLEX EAF67" from Air Products Polymers, Allentown, Pa., USA and aqueous, plasticizer-free dispersions of a thermally crosslinkable copolymer of acrylic acid esters available under the trade designations "ACRONAL A 420 S" and "ACRONAL LA 471 S" from BASF, Ludwigshafen, Germany.

In a further embodiment, the high friction coating with which the fiber mat is coated can also comprise the above described organic polymeric material and one or more types of abrasive particles. Further details, particularly with respect to useful organic polymeric materials and useful abrasive particles can be found in WO-A-2006/020058, published Feb. 23, 2006. For example, a slurry prepared by dispersing fine particles of an abrasive material in an organic polymeric material is applied to the surface(s) of the fiber mat. There is thus obtained a fiber mat having a coating in which fine particles of abrasive material(s) are selectively fixed at least on the internal surface and optionally the external surface of the fiber mat. Because the fine particles of the abrasive material are arranged at least on the contact surface of the fiber mat with the catalyst element, the coefficient of friction with the catalyst element can be increased and retaining reliability of the catalyst element can be further improved. Furthermore, when the catalyst element and the fiber mat, which is wound around the catalyst element, are canned, the movement between the catalyst element and the wrapped fiber mat can be prevented, or at least significantly reduced, without detrimentally affecting the ability of the catalytic converter to be assembled.

Coating of the mounting mat with a high friction coating as explained above, can be advantageously conducted with known conventional technologies such as spraying, brushing, laminating, printing (e.g., screen printing) and the like. A preferred method is spray coating by using, for example, a lacquer spray system such as an air brush, which is satisfactorily conducted by, for example, only preparing a spray solution or dispersion and successively or simultaneously spraying the solution or dispersion (e.g., the acrylic latex or the like lattices as mentioned above), on one or both main surfaces of the fiber mat. The operation is therefore simple and economical. The solution or dispersion subsequent to spraying may be dried naturally or dried by heating to a suitable temperature (e.g., 110° C.). The solid component content of the high friction coating on the side of the internal surface of the fiber mat is preferably from about 5 g/m² to 100 g/m², more preferably from about 10 g/m² to 50 g/m², and the solid component content of the high friction coating on the external surface of the mounting mat is preferably from about 0.5 g/m² to 10 g/m². Preferably, a thin continuous or discontinuous coating of the high friction coating material is formed on the internal and optionally the external surface of the mounting mat, respectively. The used coating method is adapted such that any capillary actions of the mounting mat are minimized and that the high friction coating material does not essentially invade the mounting mat. That is, the high friction coating should substantially be present only on the surface of the mounting mat and should not essentially infiltrate the mat. This can be achieved by using, for example, coating solutions or dispersions having a high solids concentration, addition of emulsifying agents or thixotropic agents or the like additives having similar effects to the solution or dispersion, coating the mounting mat, coating conditions under which the used solvent rapidly evaporates and the like, or by lamination of the essentially solvent-free high friction coating. It is preferred that the high friction coating infiltrates less than 10%, preferably, less than 5%, more preferably, less than 3% and most preferably, less than 1% of the thickness of the mounting mat.

EXAMPLES

The following examples further illustrate the present invention without the intention to limit the invention thereto.

List of Materials

Test Methods

Cyclical Compression Test

The test apparatus for the Cyclical Compression Test comprised the following elements:
a.) A tensile tester model Zwick/Roell Model Z010, obtained from Zwick GmbH & CoKG, Ulm, Germany, comprising a lower fixed portion with a load cell capable of measuring forces up to 10 kN and an upper portion movable apart from the lower portion in the vertical direction at a rate defined as the "crosshead speed";
b.) A test fixture consisting of 2 stainless steel blocks with a base area of 6 cm×8 cm each containing heating elements capable of heating the blocks independently of each other to at least 900° C. The lower stainless steel block is firmly attached to the load cell and the upper steel block is firmly attached to the upper movable portion (crosshead) of the tensile tester so that the base areas of the blocks are positioned vertically above each other. Each stainless steel block is equipped with a thermal couple, which is located in the center of the block;
c.) A laser extensiometer obtained from Fiedler Optoelektronik, Lützen, Germany, which measures the open distance between the stainless steel blocks.

Mounting mat samples to be tested had a diameter of approximately 2 inches (51 mm) and were positioned directly on the lower stainless steel block.

The gap was then closed compressing the mounting mat to a defined compressed density, also referred to as open gap.

| Trade Designation | Supplier | Material Type | Chemical Composition | State/Dimensions |
|---|---|---|---|---|
| ISOFRAX | Unifrax Corp. HQ, Niagara Falls, NY, USA | Biosoluble Ceramic Fiber | Alkaline earth silicate, 75% $SiO_2$, 23% MgO | Bulk Fiber |
| SUPERWOOL 607HT | Thermal Ceramics, HQ in Rueil, Malmaison, France | Biosoluble Ceramic Fiber | Alkaline earth silicate, 75% $SiO_2$, 23% CaO/MgO | Bulk Fiber |
| SAFFIL 3D+ | Saffil Ltd., United Kingdom | Polycrystalline Ceramic Fiber | 96% $Al_2O_3$, 4% $SiO_2$ | |
| Silica Yarn K11C6 | Polotsk-Steklovolokno Co., Belarus | Silica Fiber | 95% $SiO_2$ | Chopped Fiber |
| R-Glass | St. Gobain Vetrotex, Chambery, France | Glass Fiber | 60% $SiO_2$, 25% $Al_2O_3$, 9% CaO, 6% MgO | Chopped Fiber |
| Vermiculite | — | Natural Mineral | Magnesium aluminium iron silicate mineral | Fine Particles |
| belCoTex | belChem Co., Freiberg, Germany | Silica Fiber | 95% $SiO_2$ | Chopped Fiber |
| TREVIRA 255 | Trevira GmbH, Germany | Bi-Component Fiber | Core/sheath PES/Polyethylene | Staple Fiber |
| VESTAMELT 4680-P1 | Evonik Industries AG, Germany | Co-Polyester powder | Co-Polyester | Powder |
| AERODISP W630 | Evonik Industries AG, Germany | Nanoparticle | $Al_2O_3$ | 30% dispersion in water |
| VP Dispersion W 2650X | Evonik Industries AG, Germany | Nanoparticle | $ZrO_2$ | 50% dispersion in water |
| AEROSIL 200 | Evonik Industries AG, Germany | Nanoparticle | Pyrogenic silica ($SiO_2$) | Powder |
| LAPONITE RD | Southern Clay Products Inc., Gonzales/TX, U.S.A | Nanoparticle | Layer silicate, 55% $SiO_2$, 26% MgO, 6% NaO, 4% $P_2O_5$ | Powder or dispersion |
| BINDZIL CAT 220 | Eka Chemicals AB, Bohus, Sweden | Nanoparticle | Silica sol ($SiO_2$) | Dispersion |

The pressure exerted by the mounting mat was recorded after one minute relaxation in the open gap position. After this both stainless steel blocks were heated with a rate of 30° C. per minute until the defined test temperature was reached. During this time the gap between the stainless steel blocks was kept constant (i.e., the metal expansion was continuously compensated via the laser extensiometer). The lowest pressure during the heat-up period was recorded.

After heat-up the cycling started by closing the gap to a second defined mat density, also referred to as closed gap. Then gap was opened again to the open gap position. This cycle was repeated 500 times. The crosshead speed during cycling was 2.5 meters per minute. The open and closed gap pressures of the last cycle were recorded.

Real Condition Fixture Test (RCFT)

The test apparatus for the RCFT comprised the following:
a.) A commercially available tensile tester (obtained under the trade designation "MTS" Model Alliance RT/5, from Material Test Systems, Eden Prairie, Minn.) comprising a lower fixed portion and an upper portion movable apart from the lower portion in the vertical direction at a rate defined as the "crosshead speed" and bearing a load cell capable of measuring forces up to 5 kN;
b.) A test fixture consisting of 2 stainless steel blocks with a base area of 6 cm×8 cm each containing heating elements capable of heating the blocks independently of each other to at least 900° C. The lower stainless steel block is firmly attached to the lower fixed portion and the upper steel block is firmly attached to the load cell at the upper movable portion (crosshead) of the tensile tester so that the base areas of the blocks are positioned vertically above each other. Each stainless steel block is equipped with a thermal couple, located in the centre of the block;
c.) A laser extensiometer obtained from Fiedler Optoelektronik, Lützen, Germany, which measures the open distance (gap) between the stainless steel blocks.

A mounting mat sample having dimensions of 44.5 mm×44.5 mm was placed between the stainless steel blocks. The gap was closed with a crosshead speed of 1.0 m/min to a defined mounting mat density. After this each stainless steel block was heated incrementally to a different temperature profile to simulate the temperature of the metal housing and the ceramic substrate in an exhaust gas treatment device. During heating, the gap between the stainless steel blocks was increased by a value calculated from the temperatures and thermal expansion coefficients of a typical exhaust gas treatment device housing and ceramic substrate.

The RCFT's were carried out with two different temperature profiles here. The first profile simulates a maximum temperature of the ceramic substrate of 500° C. and a maximum temperature of the metal can of 200° C. The second profile simulates maximum temperatures of 700° C. for the ceramic substrate and 400° C. for the metal can.

After heating to the maximum temperature, the stainless steel blocks were cooled incrementally and the gap was decreased by a value calculated from the temperatures and thermal expansion coefficients. The pressure exerted by the mounting mat during the heating and cooling cycle was recorded. The mounting mat sample and the steel blocks were cooled to 35° C. and the cycle was repeated two more times while the pressure exerted by the mounting mat was recorded. A minimum pressure of at least 50 kPa for each of the 3 cycles is typically considered desirable for mounting mats.

Examples 1A, 1B and C1

In Comparative Example C1, an intumescent mounting mat of the following composition was prepared:

Composition of Comparative Example C1 (Parts Per Weight)

46.2% fiber (""SUPERWOOL" 607HT")
11.5% chopped R-glass fiber 6 mm long, heat treated for 1 hour at 700° C.
38.5% unexpanded vermiculite
3.8%—P1 powder ("VESTAMELT 4680")

The intumescent mounting mat of comparative example C1 was made on a 310 mm wide non-woven-machine built, obtained from Formfiber, Denmark, and operating according to the method disclosed above. The forming box of this machine essentially corresponded to the schematic drawing shown in FIG. 2 whereby the forming box had two rows of three spike rolls arranged opposite each other in the upper part and two rows of three spike rolls arranged opposite each other near the bottom of the forming box. An endless belt screen ran between these upper and lower spike rows as shown in FIG. 2. A forming wire was arranged below the bottom of the forming box.

The inorganic fibers and the polymeric powder were fed into the machine via a transportation belt. At first the fibers were passed through a pre-opening section with 2 rotating spike rolls. After this the fibers were blown into the top of the forming chamber. The vermiculite was then fed directly into the top of the forming section via a second transportation belt. The fibers and particles were collected on the forming belt, which was moving at a speed of about 1 m/min. A thin paper non-woven scrim with an area weight of about 18 g/m$^2$ was fed into the lower part of the forming chamber in order to support the mat during transportation. After the forming section the mat was passed though a hot air oven. The oven temperature was at 140° C., which heat activated the polymeric powder. Directly after the oven the mat was compressed with a roller in such a way that the originally formed thickness of about 25 mm was reduced to about 8 mm.

These mounting mats (examples) were then subjected to cyclic compression testing and the Real Condition Fixture Test (RCFT).

Example 1A

The intumescent mounting mat of Example 1A was prepared in the same manner as described above with the exception that 1.0% (related to total mat composition) of dispersion (obtained under the trade designation "AERODISP W 630" from Evonik Industries AG, Frankfurt, Germany) was evenly sprayed onto the fibers on the transportation belt using a manual pump sprayer, before they were fed into the pre-opening section.

Example 1B

The intumescent mounting mat of Example 1B was prepared in the same manner as described above with the exception that 3.0% (related to the total mat composition) of dispersion (obtained under the trade designation "VP DISPERSION W2650X" from Evonik Industries AG, Frankfurt, Germany) was evenly sprayed onto the fibers on the transportation belt using a manual pump sprayer, before they were fed into the pre-opening section.

TABLE 1

Cyclic Compression Test @ 500° C., mount densities
0.73 g/cm³ (open gap) and 0.80 g/cm³ (closed gap)

| Example No. | Starting pressure-<br>1 minute relaxed<br>(kPa) | Lowest Pressure<br>during Heat-<br>up (kPa) | Pressure after 500<br>Cycles-open gap<br>(kPa) |
|---|---|---|---|
| C 1 | 285 | 144 | 48 |
| 1A | 458 | 192 | 51 |
| 1B | 514 | 209 | 55 |

TABLE 2

Results from RCFT at mount density 0.8 g/cm³

Simulation of maximum 500° C. monolith surface temperature and maximum 200° C. can temperature

| Example No. | Starting<br>Pressure (kPa) | Lowest Pressure in<br>Cycle 1 | Lowest Pressure in<br>Cycle 3 |
|---|---|---|---|
| C 1 | 402 | 160 | 145 |
| 1A | 651 | 193 | 167 |
| 1B | 723 | 192 | 164 |

The results from Cyclic Compression Test and RCFT illustrate the improvement of the holding pressure performance for both intumescent mat examples containing nanoparticles ("AERODISP W 630" and "VP DISPERSION W2650X") versus the Comparative Example C1.

Examples 2A, 2B and C2

Comparative Example C2

In Comparative Example C2, a mounting mat having the following composition was made:

Composition of Comparative Example C2

32.4% fibers ("SUPERWOOL 607HT")
32.4% chopped R-glass fiber 36 mm long, heat treated for 1 hour at 700° C.
32.4% chopped ("BELDOTEX 225") 6 mm long, heat treated for 1 hour at 800° C.
2.9% Bi-component fibers ("TREVIRA 255")

The mounting mat of Comparative Example C2 was made on a 310 mm wide non-woven-machine built as described above in Comparative Example C1.

The inorganic fibers and the binder fibers were fed into the machine via a transportation belt. At first the fibers were passed through a pre-opening section with 2 rotating spike rolls. After this the fibers were blown into the top of the forming chamber. The fibers were then collected on the forming belt moving at a speed of about 1 m/min. A thin paper non-woven scrim with an area weight of about 18 g/m² was fed into the lower part of the forming chamber in order to support the mat during transportation. After the forming section the mat was passed though a hot air oven. The oven temperature was at 140° C. for heat activating the binder fibers. Directly after the oven the mat was compressed with a roller in such a way that the originally formed thickness of about 45 mm was reduced to about 13 mm.

Composition of Example 2A

The mounting mat of Example 2A was prepared in the same manner as described above for Comparative Example C2 with the exception that 10% nanoparticle dispersion (related to the total mat composition) (obtained under the trade designation "BINDZIL CAT 220" from Eka Chemicals, Sweden), which was diluted to 5% solids, was evenly sprayed onto the fibers on the transportation belt using a manual pump sprayer, before they were fed into the pre-opening section.

Composition of Example 2B

The mounting mat of Example 2B was prepared in the same manner as described above for Comparative Example C2 with the exception that 2.8% (related to the total mat composition) of nanoparticles (obtained under the trade designation "AEROSIL 200" from Evonik Industries, Germany) were manually added onto the fibers on the transportation belt before they were fed into the pre-opening section.

TABLE 3

Cyclic Compression Test @ 500° C.; mount densities
0.50 g/cm³ (open gap) and 0.55 g/cm³ (closed gap)

| Example No. | Starting pressure-<br>1 minute relaxed<br>(kPa) | Lowest Pressure<br>during Heat-<br>up (kPa) | Pressure after 500<br>Cycles-open gap<br>(kPa) | Pressure after 500<br>Cycles-closed gap<br>(kPa) |
|---|---|---|---|---|
| C2 | 252 | 47 | 18 | 212 |
| 2A | 447 | 126 | 43 | 309 |
| 2B | 354 | 166 | 55 | 310 |

The Cyclic Compression Test results show a good pressure increase for both examples using nanoparticles ("BINDZIL CAT 220" and "AEROSIL 200").

TABLE 4

Results from RCFT, mount density 0.5 g/cm³

| | Simulation of maximum 500° C. monolith surface temperature and maximum 200° C. can temperature | | | Simulation of maximum 700° C. monolith surface temperature and maximum 400° C. can temperature | | |
|---|---|---|---|---|---|---|
| Example No. | Starting Pressure (kPa) | Lowest Pressure in Cycle 1 | Lowest Pressure in Cycle 3 | Starting Pressure (kPa) | Lowest Pressure in Cycle 1 | Lowest Pressure in Cycle 3 |
| C2 | 285 | 54 | 54 | 275 | 27 | 25 |
| 2A | 493 | 131 | 126 | 480 | 81 | 67 |
| 2B | 371 | 153 | 138 | 414 | 88 | 77 |

The RCFT results show a good pressure increase for both examples using nanoparticles in both RCFT tests. Specifically the improvements of the lowest pressures under simulated use conditions in cycle 1 and 3 are remarkable (>100%).

Examples C3 and 3A

Comparative Example C3 and Example 3A having the compositions described below were produced according to the process described above for the making of the mounting mats of Examples C2, 2A and 2B. In addition to the heat bonding process of the binder fibers after the forming section, the mat was needled with 24 punches per cm² using a needle tacker (obtained from Dilo, Eberbach. Germany).

Composition of Comparative Example C3

31.8% fibers ("ISOFRAX")
31.8% fibers ("SAFFIL 3D+")
31.8% chopped silica fibers 65 mm long (obtained under the trade designation "SILICA YARN K11C" from Steklovolokno); the fibers were heat treated in a kiln at 800° C. for 1 hour
4.6% Bi-component fibers ("TREVIRA 255")

Composition of Example 3A

A sample with the same composition as the mounting mat of Comparative Example 3 was impregnated with a 0.5% suspension of nanoparticles ("LAPONITE RD") in water, by immersion of the mat in the suspension and subsequent drying in an oven at 120° C. for 50 min.

TABLE 5

Cyclic Compression Test @ 500° C.; mount densities
0.52 g/cm³ (open gap) and 0.58 g/cm³ (closed gap)

| Example No. | Lowest Pressure during Heat-up (kPa) | Pressure after 500 Cycles 500-open gap (kPa) | Pressure after 500 Cycles 500-closed gap (kPa) |
|---|---|---|---|
| C3 | 42 | 16 | 182 |
| 3A | 198 | 46 | 390 |

A significant (>100%) pressure increase of the nanoparticles ("LAPONITE RD") containing mounting mat versus the Comparative Example C3 without nanoparticle incorporation can be seen.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. Mounting mat for mounting a pollution control element in a housing of a pollution control device, the mounting mat comprising a non-woven mat of inorganic fibers having distributed therein intumescent material and inorganic particles having an average diameter of 1 nm to 100 nm, wherein the non-woven mat is suitable for absorbing mechanical and thermal shock as well as compensating for thermal expansion differences between the pollution control element and the housing, and the mounting mat is free of organic binder or contains organic binder in an amount of not more than 5% by weight, based on the total weight of the mounting mat.

2. Mounting mat according to claim 1, wherein the inorganic particles are contained in said non-woven mat in an amount in the range of from at least 0.5% to 10% by weight.

3. Mounting mat according to claim 1, wherein the intumescent material comprises vermiculite ore, graphite, sodium silicate or combinations thereof.

4. Mounting mat according to claim 3, further comprising one or more layers selected from scrims and nettings wherein said mounting mat is an intumescent mounting mat.

5. Mounting mat according to claim 1, wherein the inorganic fibers are selected from melt formed ceramic fibers including annealed melt-formed ceramic fibers, sol-gel formed ceramic fibers, polycrystalline fibers, glass fibers including heat treated glass fibers, alumina-silica fibers, bio-soluble fibers, and combinations thereof.

6. Mounting mat according to claim 1, wherein said mounting mat is needle-punched or stitch-bonded.

7. Mounting mat according to claim 1, further comprising one or more layers selected from scrims and nettings.

8. Mounting mat according to claim 7, wherein the scrim or netting comprises inorganic fibers.

9. Mounting mat according to claim 1, wherein the inorganic particles comprise oxides of silica, alumina or zirconia, titania or silicates.

10. Pollution control device having a housing, a pollution control element disposed within the housing, and a mounting mat disposed between the pollution control element and the housing for positioning the pollution control element and for absorbing mechanical and thermal shock, wherein the mounting mat comprises a mounting mat as defined in claim 1.

11. A method of making a mounting mat as defined in claim 1 comprising the steps of:
(i) supplying inorganic fibers through an inlet of a forming box having an open bottom positioned over a forming wire to form a mat of fibers on the forming wire, the forming box having a plurality of fiber separating rollers provided in at least one row in the housing between the inlet and housing bottom for breaking apart clumps of fibers and an endless belt screen;

(ii) capturing clumps of fibers on a lower run of the endless belt beneath fiber separating rollers and above the forming wire;
(iii) conveying captured clumps of fibers on the endless belt above fiber separating rollers to enable captured clumps to release from the belt and to contact and be broken apart by the rollers;
(iv) transporting the mat of fibers out of the forming box by the forming wire; and
(v) compressing the mat of fibers and restraining the mat of fibers in its compressed state thereby obtaining a mounting mat having a desired thickness suitable for mounting a pollution control element in the housing of a catalytic converter;
wherein inorganic particles having an average diameter of 1 nm to 100 nm are provided in the mounting mat.

12. A method according to claim 11, wherein the inorganic particles are provided in the mounting mat by supplying a powder of inorganic particles to the forming box.

13. A method according to claim 11, wherein the inorganic particles are provided in the mounting mat by spraying a dispersion of the inorganic particles on the inorganic fibers before supplying the inorganic fibers to the forming box or by spraying the dispersion on the mat of fibers before or after compression thereof.

14. Mounting mat according to claim 1, wherein said inorganic particles are evenly distributed within said non-woven mat.

15. Mounting mat according to claim 14, wherein said non-woven mat further contains an intumescent material.

16. Mounting mat according to claim 15, wherein said mounting mat is an intumescent mounting mat.

17. Pollution control device having a housing, a pollution control element disposed within the housing, and a mounting mat disposed between the pollution control element and the housing for positioning the pollution control element and for absorbing mechanical and thermal shock, wherein the mounting mat comprises a mounting mat as defined in claim 16.

18. Mounting mat according to claim 14, wherein the inorganic particles comprise oxides of silica, alumina or zirconia, titania or silicates.

19. Pollution control device having a housing, a pollution control element disposed within the housing, and a mounting mat disposed between the pollution control element and the housing for positioning the pollution control element and for absorbing mechanical and thermal shock, wherein the mounting mat comprises a mounting mat as defined in claim 14.

20. Mounting mat according to claim 1, wherein the non-woven mat contains more of the inorganic fibers by weight than the inorganic particles.

* * * * *